(12) United States Patent
Winarski et al.

(10) Patent No.: US 11,406,056 B2
(45) Date of Patent: Aug. 9, 2022

(54) SOCIAL FARMING NETWORK AND CONTROL SYSTEM FOR AGRICULTURAL CHEMICAL MANAGEMENT

(71) Applicant: H2GR0, LLC, Tucson, AZ (US)

(72) Inventors: Tyson York Winarski, Mountain View, CA (US); Joel Dominguez, Pasadena, CA (US); Swati Kumari, San Jose, CA (US)

(73) Assignee: H2GR0, LLC, Tucson, AZ (US)

( * ) Notice: Subject to any disclaimer, the term of this patent is extended or adjusted under 35 U.S.C. 154(b) by 453 days.

(21) Appl. No.: 16/666,396

(22) Filed: Oct. 28, 2019

(65) Prior Publication Data

US 2020/0178458 A1   Jun. 11, 2020

Related U.S. Application Data

(60) Provisional application No. 62/775,784, filed on Dec. 5, 2018.

(51) Int. Cl.
*A01C 21/00* (2006.01)
*G06Q 50/02* (2012.01)
(Continued)

(52) U.S. Cl.
CPC .......... *A01C 21/005* (2013.01); *B64C 39/024* (2013.01); *B64D 1/18* (2013.01);
(Continued)

(58) Field of Classification Search
CPC . A01C 21/005; B64C 39/024; B64C 2201/12; B64C 2201/141; B64D 1/18; G06Q 30/018; G06Q 50/02
See application file for complete search history.

(56) References Cited

U.S. PATENT DOCUMENTS

| | | | | |
|---|---|---|---|---|
| 2016/0307448 A1* | 10/2016 | Salnikov | ................ | G05D 1/104 |
| 2018/0262571 A1 | 9/2018 | Akhtar | | |
| 2019/0389577 A1* | 12/2019 | Jones | .................... | B64C 39/024 |

FOREIGN PATENT DOCUMENTS

| | | | | | |
|---|---|---|---|---|---|
| CN | 103558257 A | * | 2/2014 | ............ | G01N 27/02 |
| CN | 204116927 | | 1/2015 | | |
| CN | 109129573 | | 1/2019 | | |

OTHER PUBLICATIONS

Analene Montesines Nagayo, Rodrigo S. Jamisola Jr. Cloud-based Wireless Monitoring System and Control of a Smart Solar-Powered Aquaponics Greenhouse to Promote Sustainable Agriculture and Fishery in an Arid Region. 2017. https://www.researchgate.net/publication/317617762_Cloud-based_Wireless_Monitoring_System_and_Control_of_a_Smart_Solar-Powered_Aquaponics_Greenhouse_to_Promote_Sustainable_Agriculture_and_Fishery_in_an_Arid_Region.

(Continued)

*Primary Examiner* — Calvin Cheung
(74) *Attorney, Agent, or Firm* — The Winarski Firm, PLLC

(57) ABSTRACT

A system and method to distribute pesticides, fertilizers, water, and other materials on a farm with accuracy and precision is disclosed in order to combat the problems imposed on the environment due to over-fertilization and over use of pesticides. This system and method is a social networking control system in which multiple farms have independent grids of sensors capable of detecting the presence of pesticides, fertilizers, water, and other materials in the air, in the top-soil, and in the groundwater. These grids of sensors detect the location and concentration of these materials and reports them back to a social control system for analysis. The control system regulates the deposition of further chemicals through computer control of the chemical dispersal systems.

20 Claims, 27 Drawing Sheets

(51) Int. Cl.
*G06Q 30/00* (2012.01)
*B64D 1/18* (2006.01)
*B64C 39/02* (2006.01)

(52) U.S. Cl.
CPC ............ *G06Q 30/018* (2013.01); *G06Q 50/02* (2013.01); *B64C 2201/12* (2013.01); *B64C 2201/141* (2013.01)

(56) References Cited

OTHER PUBLICATIONS

Elhassan Mohammed Elhassan Ahmed; Khalid Hamid Bilal Abdalla; Ibrahim khider Eltahir. Farm Automation based on IoT. 2018 https://ieeexplore.IEEE.org/document/8515853.

* cited by examiner

DISPERSAL PROGRAM UPLOAD
Upload DISPERSAL PROGRAM to mobile dispersal system from control system.
3002

DISPERSE MATERIAL ON FIRST FARM
Measure dispersal from mobile system with onboard GPS system and metered dispersal system.
Measure dispersal from the ground with the first array of sensors on the first farm and the second array of sensors on the second farm.
3004

GATHER DATA TO DETERMINE DISPERSAL LOCATION AND CONCENTRATION
Control system gathers GPS system information and metered dispersal system information from mobile system.
Control system gathers detection information from the first array of chemical sensors and the second array of chemical sensors.
3006

CONTROL SYSTEM ACTION
Determine location and concentration of dispersed material across first and second farms.
Create a revised dispersal program for the first farm to correct under and over dispersal of material in particular grid locations if needed.
Create remedial dispersal program for the second farm to correct dispersal of material meant for first farm if needed.
3008

REVISED DISPERSAL PROGRAM UPLOAD
Upload first REVISED DISPERSAL PROGRAM to the first dispersal system and upload the second REVISED DISPERSAL PROGRAM to the second dispersal system.
3010

```
        ┌──────────────────────────┐
    ┌──▶│ Execute dispersal program to │──┐
    │   │ disperse material on farm    │  │
    │   │           4002               │  ▼
```

Execute dispersal program to disperse material on farm
4002

Gather data on dispersed material (GPS and metered dispersal data from mobile system and detection data from farm networks)
4004

Determine material dispersal and create remedial dispersal program for second farm and corrective dispersal program for first farm
4006

Upload remedial and corrective dispersal programs to first and second mobile dispersal systems
4008

| Header Information | |
|---|---|
| Message Type | Dispersal Message |
| Message Body Data | |
| Timing Data | 11:05am June 28, 2018 |
| Location Data | 32.0005° N, 110.1001° W |
| Farm Information | First Farm |
| Chemical Information | Pesticide |
| Weather Information | 98°F, Wind NNW 20mph, Sunny |

196

| Header Information | |
|---|---|
| Message Type | Chemical Trespass Alert |
| Message Body Data | |
| Timing Data | 11:11am June 28, 2018 |
| Location Data | 32.2226° N, 110.9747° W |
| Farm Information | Second Farm |
| Chemical Information | Pesticide |
| Weather Information | 98°F, Wind NNW 20mph, Sunny |

FIG. 23

| Header Information | |
|---|---|
| Message Type | Terminate Dispersal Message |
| Message Body Data | |
| Timing Data | 11:12am June 28, 2018 |
| Farm Information | Second Farm |
| Chemical Information | Pesticide |
| Drone Information | First Drone Serial No. XXXX on First Farm |
| Chemical Trespass Information | Second Farm Pesticide |

200

| Header Information | |
|---|---|
| Message Type | Dispersal Program/Revised Dispersal Program |
| Message Body Data | |
| Timing Data | 11:15am June 28, 2018 |
| Farm Information | First Farm |
| Chemical Information | Pesticide |
| Drone Information | First Drone Serial No. XXXX on First Farm |
| Chemical Trespass Information | Second Farm Pesticide |
| Weather Information | 98°F, Wind NNW 20mph, Sunny |
| Program | PATH_PROGRAM.zip<br>REVISED_PATH_PROGRAM.zip<br>Path Route Data<br>Chemical Quantity Data |

| Header Information | |
|---|---|
| Message Type | Dilution Program |
| Message Body Data | |
| Timing Data | 11:25am June 28, 2018 |
| Farm Information | Second Farm |
| Chemical Information | Water |
| Drone Information | Second Drone Serial No. XXXX on Second Farm |
| Chemical Trespass Information | Second Farm Pesticide |
| Weather Information | 98°F, Wind NNW 20mph, Sunny |
| Dispersal Program | Dispersal_PROGRAM.zip<br>Path Route Data<br>Dispersal Material Quantity Data |

| CONTROL FEEDBACK SYSTEM 302 | DRONE PROGRAM MODULE FOR CHEMICAL DISPERSION 306 | |
|---|---|---|
| GRAPHICAL USER INTERFACE (GUI) 304 | CORRELATION MODULE 308 | COMM. SYSTEM 314 |
| DRONE DISPERSAL DATABASE MODULE 304 | CHEMICAL SENSOR ARRAY DATABASE MODULE 310 | |

Database Store 312

SOCIAL FARMING NETWORK AND CONTROL SYSTEM FOR AGRICULTURAL CHEMICAL MANAGEMENT

BACKGROUND

Modern farming benefits greatly from the use of fertilizers and pesticides. A correct amount of fertilizers and pesticides can greatly enhance the bounty produced on a particular farm. However, over-fertilizing or over use of pesticides can have a catastrophic effect on the farm and the environment. It is therefore desirable to develop systems and methods that can limit and reduce over-fertilization and over use of pesticides.

SUMMARY

The present invention provides a system and method to distribute pesticides, fertilizers, water, and other materials on a farm with accuracy and precision in order to combat the problems imposed on the environment due to over-fertilization and over use of pesticides. The present invention is a social networking control system in which multiple farms have independent grids of sensors capable of detecting the presence of pesticides, fertilizers, water, and other materials in the air, in the top-soil, and in the groundwater. These grids of sensors detect the location and concentration of these materials and reports them back to a social control system for analysis. The social control system is in control of various mobile vehicles that distribute pesticides, fertilizers, water, and other materials onto a farm. Each of these mobile vehicles has a GPS device in order to allow the social control system to detect the location of the mobile vehicle. Each of these mobile vehicles has a material storage tank to carry pesticides, fertilizers, water, and other materials for distribution on a farm. Each of these mobile vehicles has a material distribution meter to determine the quantity of materials being distributed at a particular rate for correlation with the GPS information of the mobile vehicle. Further, each mobile vehicle has a wireless computer control system that communicates remotely with the social control system. The social control system can develop a distribution program for the mobile vehicle specifying the geographic path that the mobile vehicle should follow for distribution of materials on the farm. The social program can develop and transmit this distribution program wirelessly to the mobile vehicle for execution. The distribution program will dictate the path and speed that the mobile vehicle will follow across the farm as well as the locations and concentrations at which the mobile vehicle will distribute material on the farm such as pesticides, fertilizers, water, and other materials. The sensor network on the farm will detect where these materials actually get deposited on the farm and report that information back to the social control system. Thus, the sensor network provides a feedback control loop to the social control system. The social control system receives information from the mobile vehicle as to where and what concentration that the mobile device deposited pesticides, fertilizers, water, and other materials. The social control system also receives information from the sensor network as to where the deposited pesticides, fertilizers, water, and other materials actually went on the farm. The social control system can then determine whether the materials were deposited where the social control system wanted them to be deposited. Due to wind, rain, air pressure, and various geographic conditions, the environment may cause materials distributed by the mobile vehicles to end up in locations different from what was programmed by the social control system. As such, the social control system develops a remedial distribution program to direct the mobile vehicle to go back and correct differences between the desired programmed distribution of materials and the actual distribution of materials. Where there is an actual distribution of materials less than the desired programmed amount, the social control system can direct the mobile vehicle to go back and deposit additional material. Where there is an actual distribution of fertilizer or pesticide materials more than the desired programmed amount, the social control system can direct the mobile vehicle to go back and deposit water or other diluting material to correct the higher than desired concentration. The distribution of materials, monitoring the deposition of the materials, and correction for errors in deposition may all occur within a single farm. However, the power of this system lies in its ability to control the distribution of materials, monitoring the deposition of the materials, and correction for errors in deposition across multiple farms within a geographic area. The social aspect of the social control system is that it is not limited to a single farm. Multiple farms in a geographic location may be equipped with their own grid of network sensors. These multiple farms may also have their own mobile vehicles that distribute materials under distribution programs set forth by the social control system. As various farms distribute materials on their respective farms, various weather or geographic conditions may distribute those materials on other farms. Having these sensor grids across multiple farms allows for the detection of materials as they are distributed. Weather and geographic conditions may cause the distribution of pesticides, fertilizers, water, soil stabilizer, fungicides, and other materials to concentrate on one particular farm. For example, one farm may be at a lower elevation at the base of some hills where wind, air pressure, and water flow may cause distributed materials to concentrate. By linking multiple farms together through these sensor grids, it is possible to manage material distribution across wider geographic areas.

A cloud-based social-networking agricultural-chemical management system is disclosed by the present invention. This system includes a first farm that has a first programmable chemical-dispersing drone configured to disperse a first chemical onto the first farm. The first also has a first chemical-sensor array positioned on the first farm. This system also includes a second farm that has a second programmable chemical-dispersing drone and a second chemical sensor array positioned on the second farm. The first and second farms may be owned and operated by separate entities or could be controlled and owned by a single entity. It is contemplated that any financial or management arrangement may be in place between the first and second farms. The system, in addition to including these first and second farms, also includes a cloud-based management system in bi-directional communications with the first and second chemical-dispersing drones, and the first and second chemical sensor arrays on the first and second farms. The second chemical sensor array generates a CHEMICAL TRESPASS ALERT MESSAGE that is transmitted to the cloud-based management system when the first chemical intended to be dispersed by the first programmable chemical-dispensing drone onto the first farm is detected by the second chemical sensor array as being on the second farm. This system therefore provides a chemical feedback loop to the first programmable chemical-dispensing drone as to how it is depositing the first chemical onto the first farm. When the first programmable chemical-dispensing drone fails to correctly apply chemicals onto the first farm, those chemicals may be detected by the chemical sensor array on the second farm and provide feedback as a part of a control loop to the first farm through the cloud-based management system. The first programmable chemical-dispersing drone sends a DISPERSAL MESSAGE to the cloud-based management system to notify the cloud-based management system to the fact that the first programmable chemical-dispersing drone is dispersing the first chemical. This dispersal message contains information related to the dispersal of the first chemical including timing information, location information, first farm information, and first programmable chemical-dispersing drone information. The CHEMICAL TRESPASS ALERT MESSAGE includes timing information, location information, second farm information, and trespassing chemical information. The cloud-based management system correlates the information from the CHEMICAL TRESPASS ALERT MESSAGE with the information from the DISPERSAL MESSAGE to determine that the first chemical being dispersed by the first programmable chemical-dispersing drone is the cause of the CHEMICAL TRESPASS ALERT MESSAGE. In response to making this correlation, the cloud-based management system generates a TERMINATE DISPERSAL MESSAGE that is transmitted to the first programmable chemical-dispersing drone to terminate further dispersal of the first chemical to stop further chemical trespass by the first chemical. The cloud-based management system generates a FIRST-REVISED DISPERSAL PROGRAM to instruct the first programmable chemical-dispersing drone to disperse the first chemical onto the first farm only, while avoiding dispersing the first chemical onto the second farm. The cloud-based management system transmits the FIRST-REVISED DISPERSAL PROGRAM to the first programmable chemical-dispersing drone to replace its initial program. The FIRST-REVISED DISPERSAL PROGRAM is created to avoid dispersal of the first chemical on to the second farm due to the transmission of the CHEMICAL TRESPASS ALERT MESSAGE. The cloud-based management system generates a SECOND-REVISED DISPERSAL PROGRAM for the second programmable chemical-dispersing drone to reduce the concentration of dispersal of a second chemical on to the second farm to account for the dispersal of the first chemical on to a portion of the second farm. The cloud-based management system transmits the SECOND REVISED DISPERSAL PROGRAM to the second programmable chemical-dispersing drone to replace its initial program due to the transmission of the CHEMICAL TRESPASS ALERT MESSAGE. The first and second farms may be geographically adjacent to each other. Alternatively, the first and second farms may be separated by a distance of less than 1 mile. Alternatively, the first and second farms may be separated by a distance of more than 1 mile. The first and/or second farms may have a geographic size larger than ten acres. Alternatively, the first and/or second farms may have a size less than one-million acres. The first chemical may be a fertilizer or a pesticide. The second chemical may be a fertilizer or a pesticide. The cloud-based management system has a Graphical User Interface (GUI) accessible by the first farm that displays the location, type, and concentration of chemicals dispersed by the first chemical-dispersing drone onto the first farm. The GUI displays the location, type, and concentration of chemicals dispersed by the second chemical-dispersing drone onto the first farm. The GUI displays the location, type, and concentration of chemicals dispersed by the first chemical-dispersing drone onto the second farm. The GUI displays the first revised dispersal program. The cloud-based management system has a Graphical User Interface (GUI) accessible by the second farm that displays the location, type, and concentration of chemicals dispersed by the first chemical dispersing drone onto the second farm. The GUI displays the location, type, and concentration of chemicals dispersed by the second chemical dispersing drone onto the second farm. The GUI displays the location, type, and concentration of chemicals dispersed by the second chemical dispersing drone onto the first farm. The GUI displays the second revised dispersal program. The cloud-based program develops a DILUTION PROGRAM for the second chemical dispersing drone to neutralize the first chemical dispersed on the second farm by the first chemical-dispersing drone. The first chemical array includes a LIDAR device configured to detect the first chemical as airborne particulates released from the programmable chemical-dispersal drone. The first chemical array includes a camera configured to visually identify the first chemical. The first chemical array may also include a thermal camera to monitor and identify the first chemical when it is deposited by the drone based on the different absorbent heat capacities of chemicals. The first chemical array includes a direct-reading chemical sensor that functions by detecting and rapidly responding to the presence or concentration of an analyte at an interface between the sensor and a sample matrix containing the analyte. The direct-reading chemical sensor may be an electrochemical sensor or include an optical fiber. The first chemical array includes a sensor that uses chromatographic, spectroscopic, ultra-violet sensors, infra-red sensors, or electrophoretic process to identify the first chemical.

A cloud-based chemical management control system for agriculture is disclosed that is configured to identify and correct for chemical trespasses where chemicals meant to be dispersed on one farm end up on another farm. This system includes a cloud-based chemical management control system that communicates with both a first chemical-sensor array located on a first farm and a second chemical-sensor array located on a second farm for managing the dispersal of chemicals between the two farms. The cloud-based chemical management control system bi-directionally communicates with a first programmable chemical-dispersing drone configured to disperse a first chemical on the first farm. The second chemical-sensor array generates a CHEMICAL TRESPASS ALERT MESSAGE that is transmitted to the cloud-based chemical management control system when the first chemical intended to be dispersed by the first programmable chemical-dispensing drone onto the first farm is detected by the second chemical-sensor array as being on the second farm. The first programmable chemical-dispersing drone sends a DISPERSAL MESSAGE to the cloud-based chemical management control system to notify the cloud-based chemical management control system to the fact that the first programmable chemical-dispersing drone is dispersing the first chemical. The DISPERSAL MESSAGE contains information related to the dispersal of the first chemical including timing information, location information, first farm information, type of chemical, dispensing rate and concentration, and first programmable chemical-dispersing drone information. The CHEMICAL TRESPASS ALERT MESSAGE includes timing information, location information, second farm information, and trespassing chemical information. The cloud-based chemical management control system correlates the information from the CHEMICAL TRESPASS ALERT MESSAGE with the information from the DISPERSAL MESSAGE to determine that the first chemical being dispersed by the first programmable chemical-dispersing drone is the cause of the CHEMICAL TRES- PASS ALERT MESSAGE. In response to making this correlation, the cloud-based chemical management control system generates a TERMINATE DISPERSAL MESSAGE that is transmitted to the first programmable chemical-dispersing drone to terminate further dispersal of the first chemical to stop further chemical trespass by the first chemical. The cloud-based chemical management control system generates a FIRST-REVISED DISPERSAL PROGRAM to instruct the first programmable chemical-dispersing drone to disperse the first chemical onto the first farm only based on position and weather information, while avoiding dispersing the first chemical onto the second farm. The cloud-based chemical management control system transmits the FIRST-REVISED DISPERSAL PROGRAM to the first programmable chemical-dispersing drone to replace its initial program. The FIRST-REVISED DISPERSAL PROGRAM is created to avoid dispersal of the first chemical on to the second farm due to the transmission of the CHEMICAL TRESPASS ALERT MESSAGE. The cloud-based chemical management control system generates a SECOND-REVISED DISPERSAL PROGRAM for a second programmable chemical-dispersing drone in bi-directional communication with the cloud-based chemical management control system to counteract the dispersal of the first chemical on to a portion of the second farm through dispersing a second chemical on that portion of the second farm that received the first chemical. The cloud-based chemical management control system transmits the SECOND REVISED DISPERSAL PROGRAM to the second programmable chemical-dispersing drone due to the transmission of the CHEMICAL TRESPASS ALERT MESSAGE. The first chemical is a fertilizer, pesticide, fungicide, soil stabilizer, or water, wherein said second chemical is a fertilizer, pesticide, fungicide, soil stabilizer, or water. The cloud-based chemical management control system has a Graphical User Interface (GUI) accessible by the first farm that displays the location, type, and concentration of chemicals dispersed by the first chemical-dispersing drone onto the first farm. The cloud-based chemical management control system has a Graphical User Interface (GUI) accessible by the second farm that displays the location, type, and concentration of chemicals dispersed by the second chemical-dispersing drone onto the second farm as well as the location, type, and concentration of chemicals dispersed by the first chemical-dispersing drone onto the second farm. The cloud-based chemical management control system develops a DILUTION PROGRAM for the second chemical-dispersing drone to neutralize the first chemical dispersed on the second farm by the first chemical-dispersing drone. The first and second chemical-sensor arrays have a LIDAR device configured to detect the first chemical as airborne particulates released from the first programmable chemical-dispersal drone. The first chemical-sensor array may also include a camera configured to visually identify the first chemical, or the first chemical-sensor array comprises a thermal imaging camera to identify the first chemical due to the different absorbent heat capacities of chemicals forming the first chemical. The first chemical-sensor array could also include a direct-reading chemical sensor that functions by detecting and rapidly responding to the presence or concentration of an analyte at an interface between the sensor and a sample matrix containing the analyte. The direct-reading chemical sensor may be an electrochemical sensor or includes an optical fiber. The first chemical-sensor array may have a sensor that uses chromatographic, spectroscopic, ultra-violet sensors, infra-red sensors, or electrophoretic process to identify the first chemical.

An agricultural chemical control loop feedback system is disclosed that is configured to identify and correct for chemical trespasses where chemicals meant to be dispersed on one farm end up on another farm. The system includes a first chemical sensor array covering a first area of land and a second chemical sensor array covering a second area of land. The system also includes a first programmable chemical-dispensing drone configured to disperse a first chemical on the first area of land and a cloud-based management system in communications with the first and second chemical sensor arrays and the first programmable chemical-dispensing drone. The second chemical sensor array generates a digital CHEMICAL TRESPASS ALERT MESSAGE that is transmitted to the cloud-based management system when the first chemical intended to be dispersed by the first programmable chemical-dispensing drone onto the first area of land is detected by the second chemical sensor array as being on the second area of land. The first programmable chemical-dispersing drone sends a digital DISPERSAL MESSAGE to the cloud-based management system to notify the cloud-based management system to the fact that the first programmable chemical-dispersing drone is dispersing the first chemical. The digital DISPERSAL MESSAGE contains information related to the dispersal of the first chemical including timing information, location information, first area of land information, type of chemical, and first programmable chemical-dispersing drone information. The digital CHEMICAL TRESPASS ALERT MESSAGE includes timing information, location information, second area of land information, and trespassing chemical information. The cloud-based management system correlates the information from the digital CHEMICAL TRESPASS ALERT MESSAGE with the information from the digital DISPERSAL MESSAGE utilizing a database to determine that the first chemical being dispersed by the first programmable chemical-dispersing drone is the cause of the digital CHEMICAL TRESPASS ALERT MESSAGE. In response to making this correlation, the cloud-based management system generates a digital TERMINATE DISPERSAL MESSAGE that is transmitted to the first programmable chemical-dispersing drone to terminate further dispersal of the first chemical to stop further chemical trespass by the first chemical. The cloud-based program develops a DILUTION PROGRAM for a second chemical dispersing drone to neutralize the first chemical dispersed on the second area of land by the first chemical-dispersing drone. Further aspects of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof, are best understood through the following description of the preferred embodiment of the present invention when read in conjunction with the accompanying drawings, wherein:

FIG. 1 illustrates a map depicting a farm containing a grid of chemical sensors;

FIG. 2 illustrates a map depicting a farm showing a concentration gradient of a chemical dispersed across the farm;

FIG. 3 depicts sectional view of a tree on a farm showing its trunk and branches above ground with roots below ground dipping into groundwater along with a chemical sensor system having airborne, soil based, and groundwater-based sensors;

FIG. 17 illustrates a process flow diagram depicting a process for operating a chemical control-loop on dispersing chemicals onto a farm within a neighborhood of farms using chemical dispensing drones in communication with a cloud-based application that is also in communication with chemical sensor arrays located on each farm for detecting and measuring dispensed chemicals;

FIG. 18 illustrates a process flow diagram depicting a process for operating a chemical control-loop on dispersing chemicals onto a farm within a neighborhood of farms using chemical dispensing drones;

FIG. 23 illustrates an information structure and accompanying data for a CHEMICAL TRESPASS ALERT;

FIG. 25 illustrates an information structure and accompanying data for a REVISED DISPERSAL PROGRAM;

FIG. 26 illustrates an information structure and accompanying data for a DILUTION PROGRAM; and FIG. 27 illustrates software module diagram of the cloud-based social farming network and associated chemical control system regulating the chemical control feedback loop between the drones and chemical sensor arrays.

DETAILED DESCRIPTION

Figure 1:
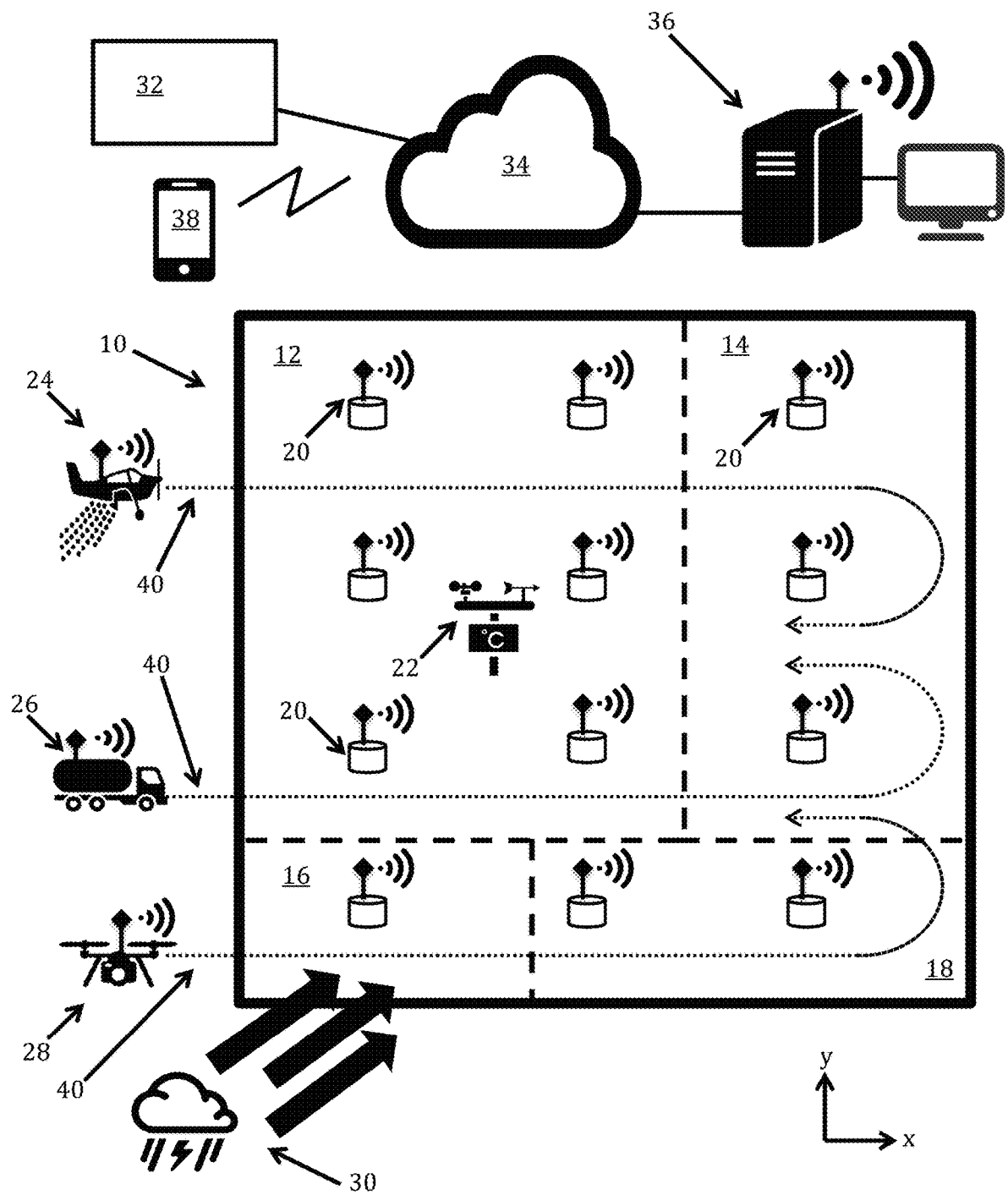
Figure 2:
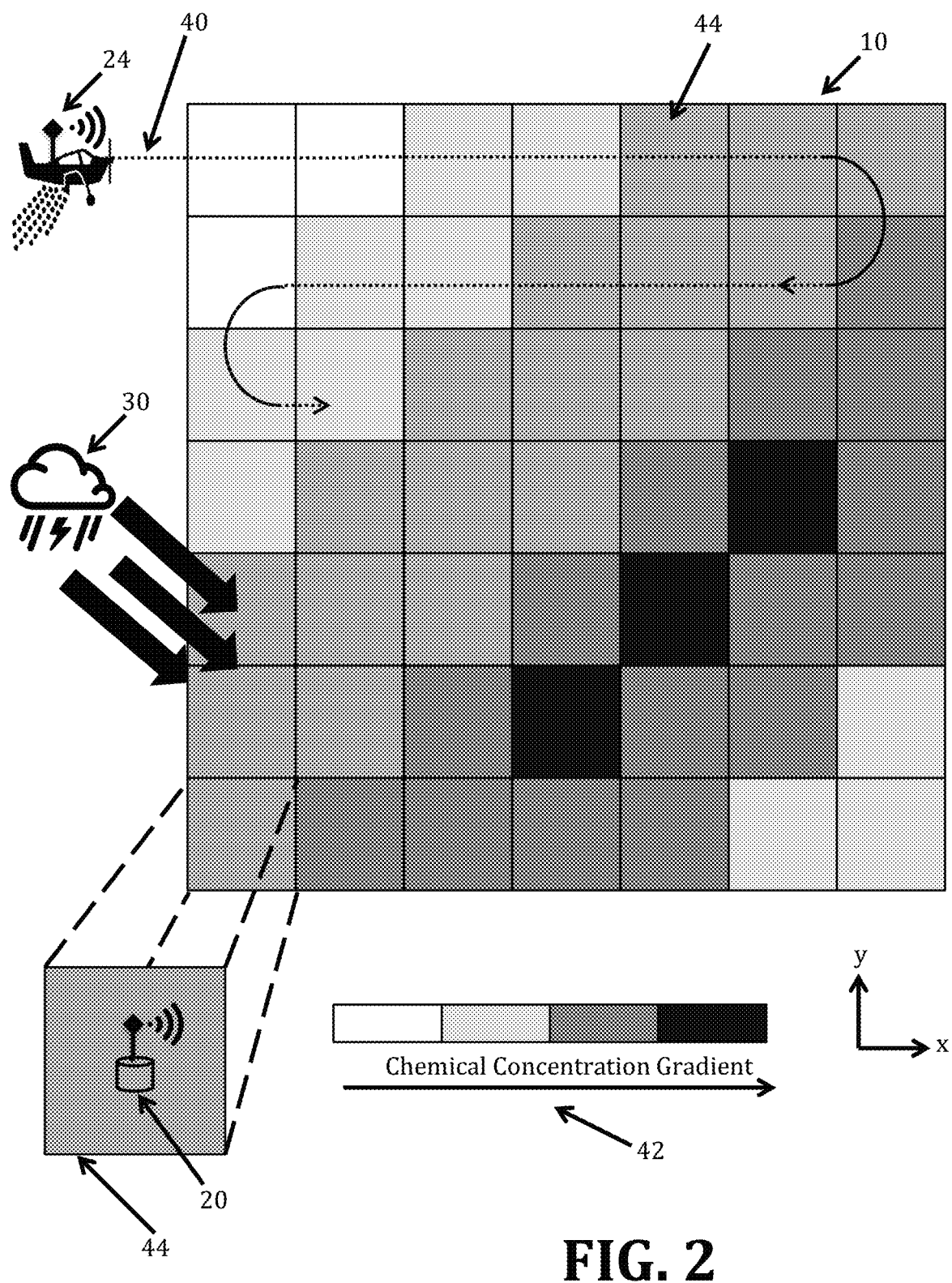
Figure 3:
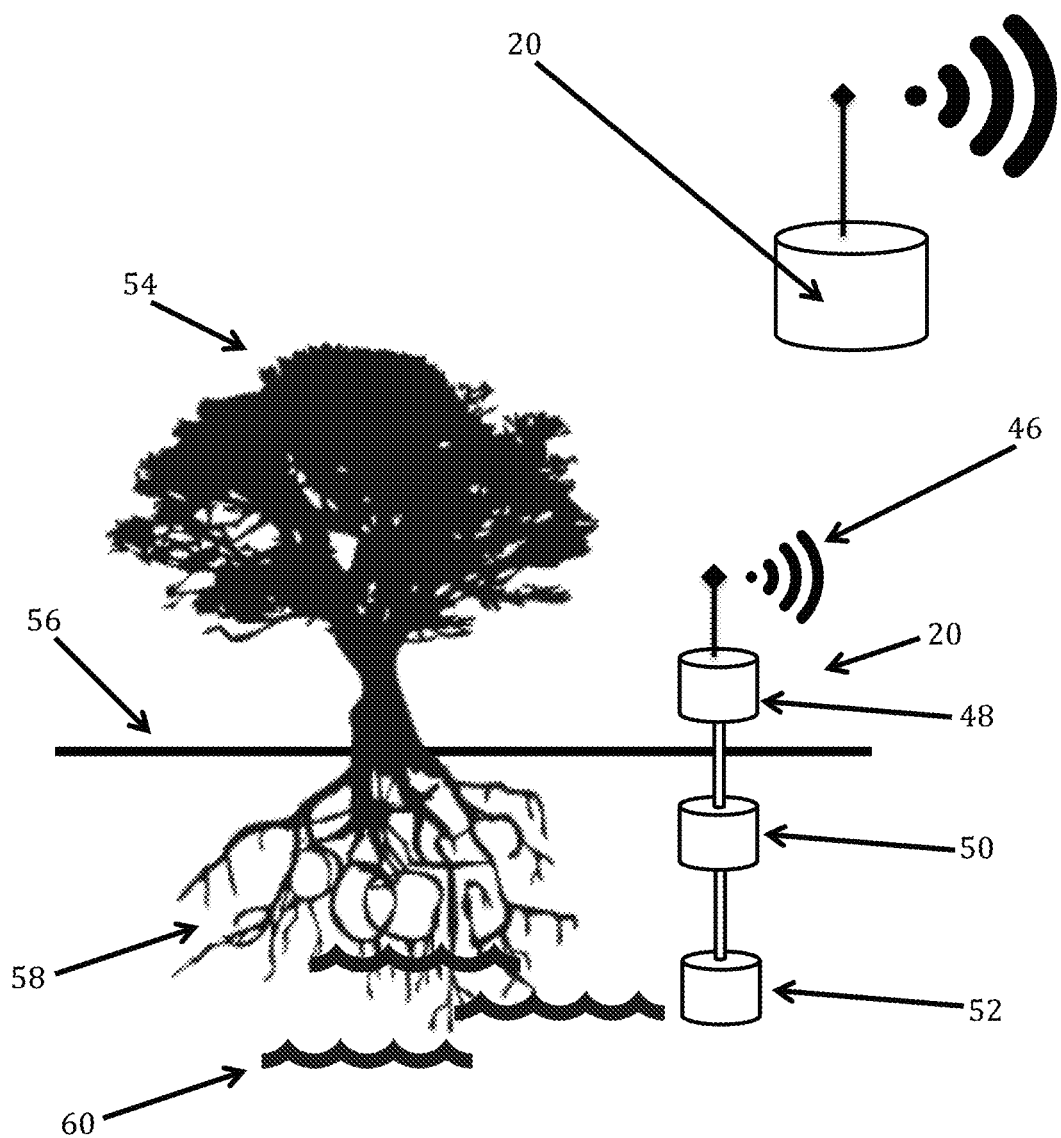
Figure 4:
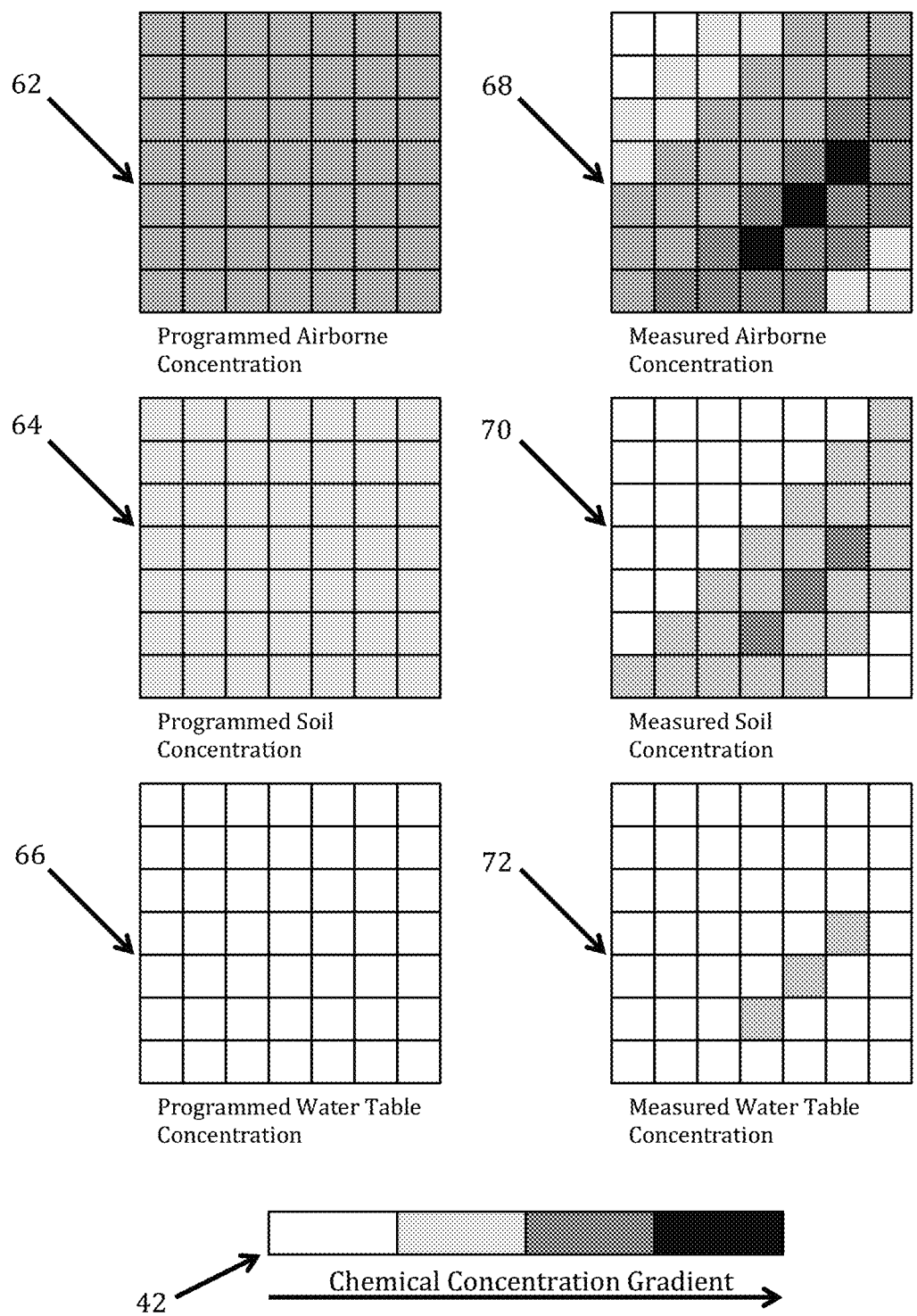
FIG. 4 illustrates a set of chemical concentration grids for the air, soil and groundwater for an ideal programmed concentration and an actual measured concentration.
Figure 5:
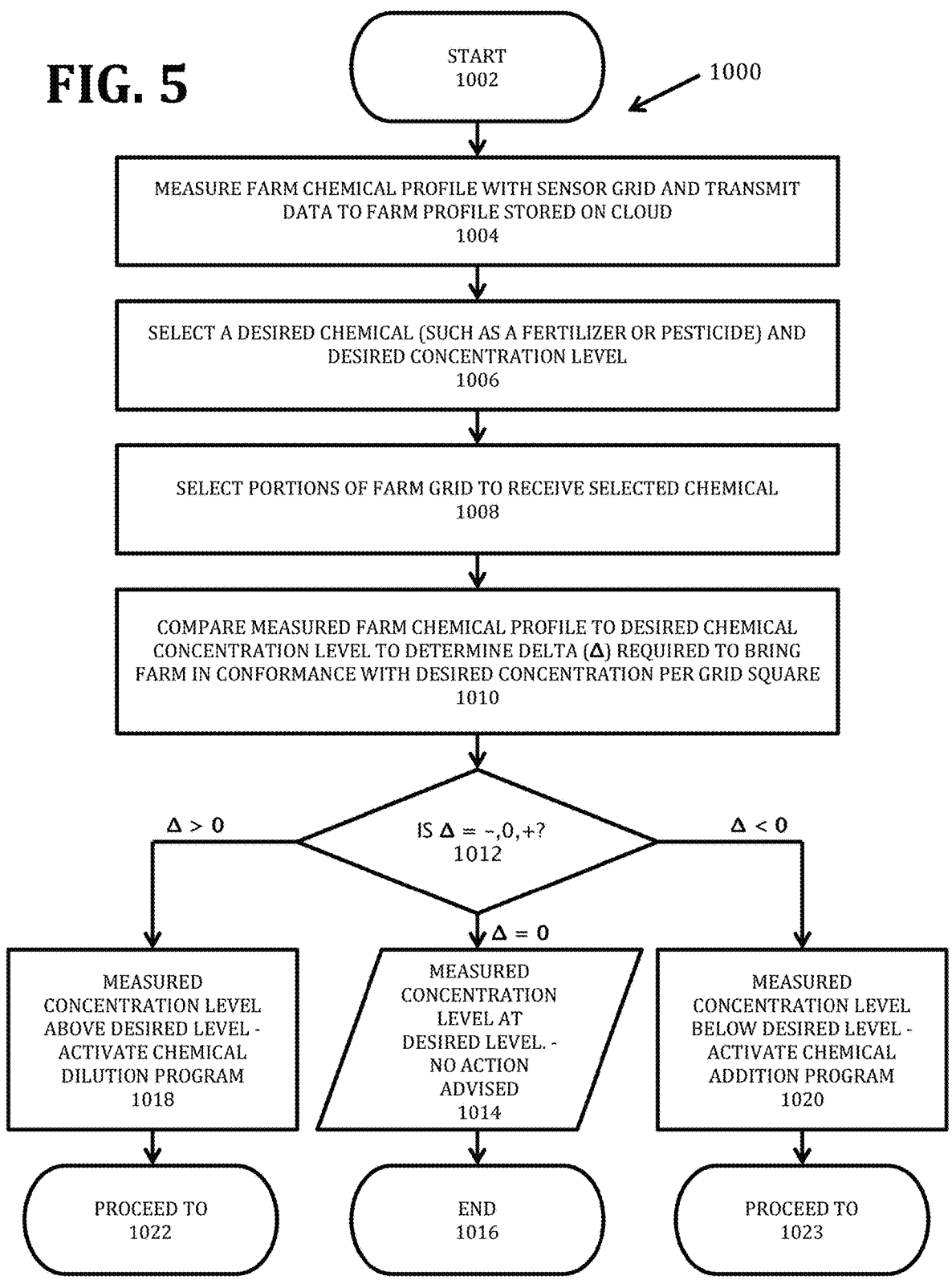
FIGS. 5-7 depict a flowchart illustrating a computer process flow for dispersing chemicals onto a farm with a drone, measuring the resulting concentrations of chemicals actually deposited onto the farm with a chemical sensor array, and then implementing a control feedback loop to correct deviations from an ideal concentration amount.
Figure 6:
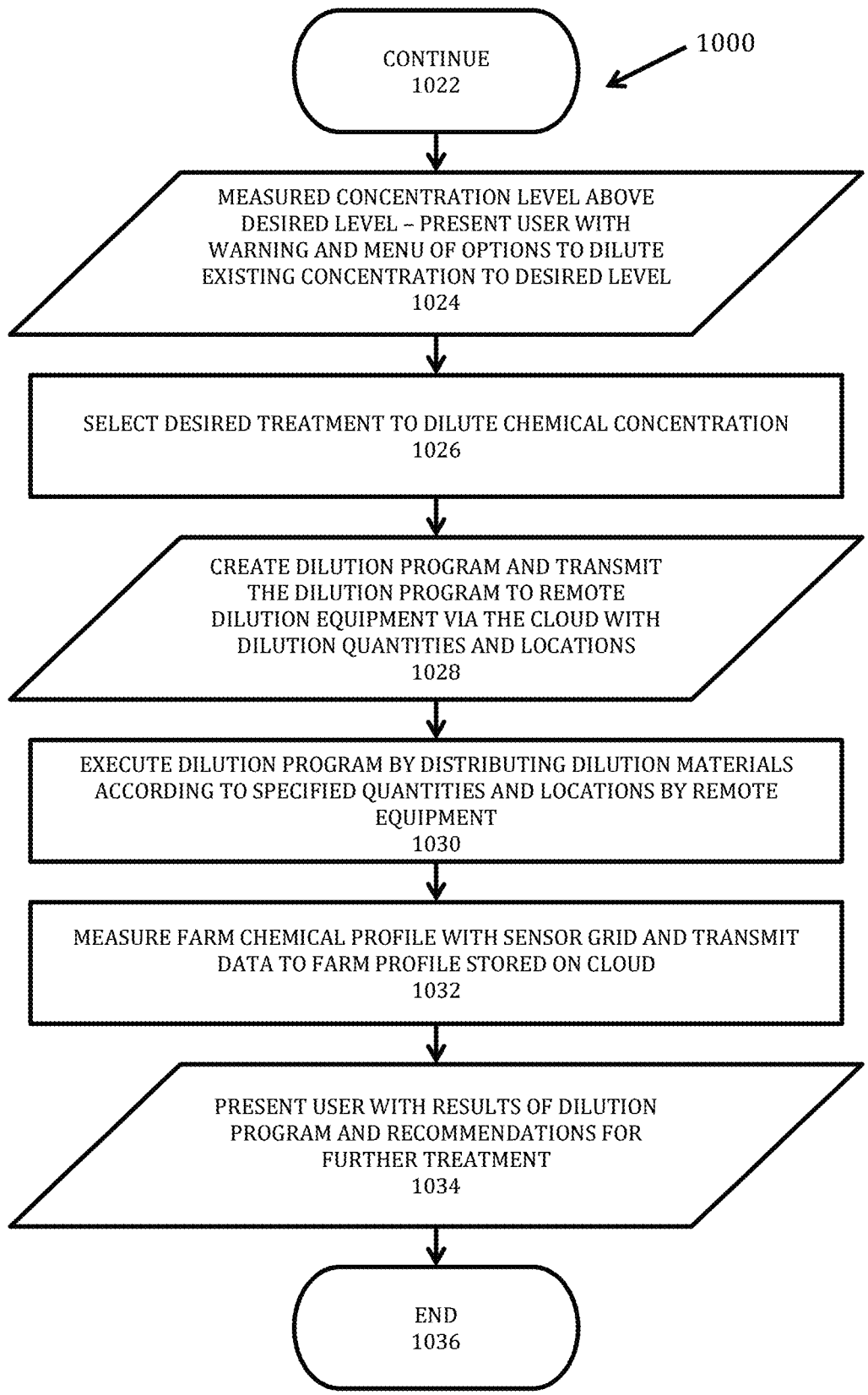
Figure 7:
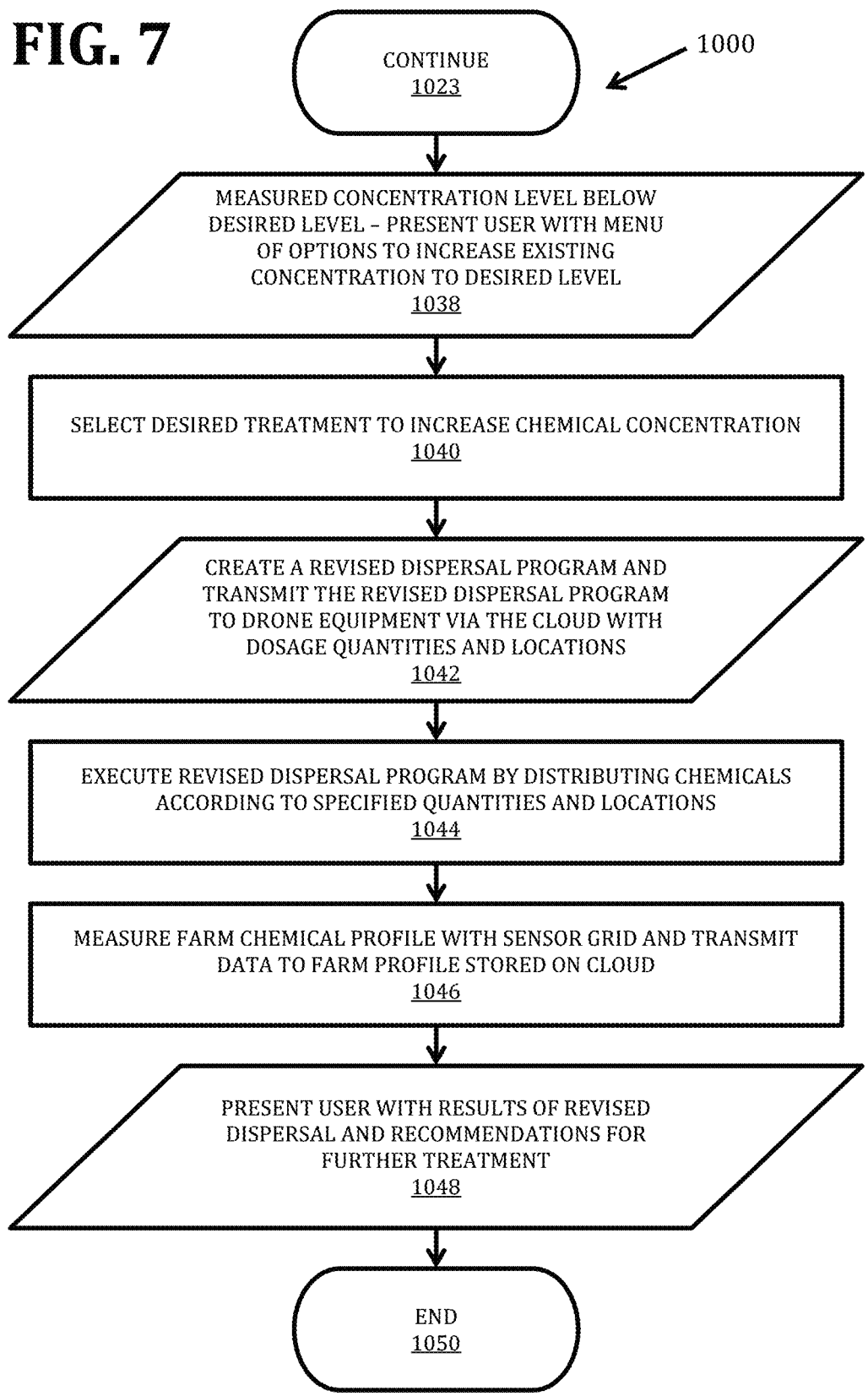
Figure 8:
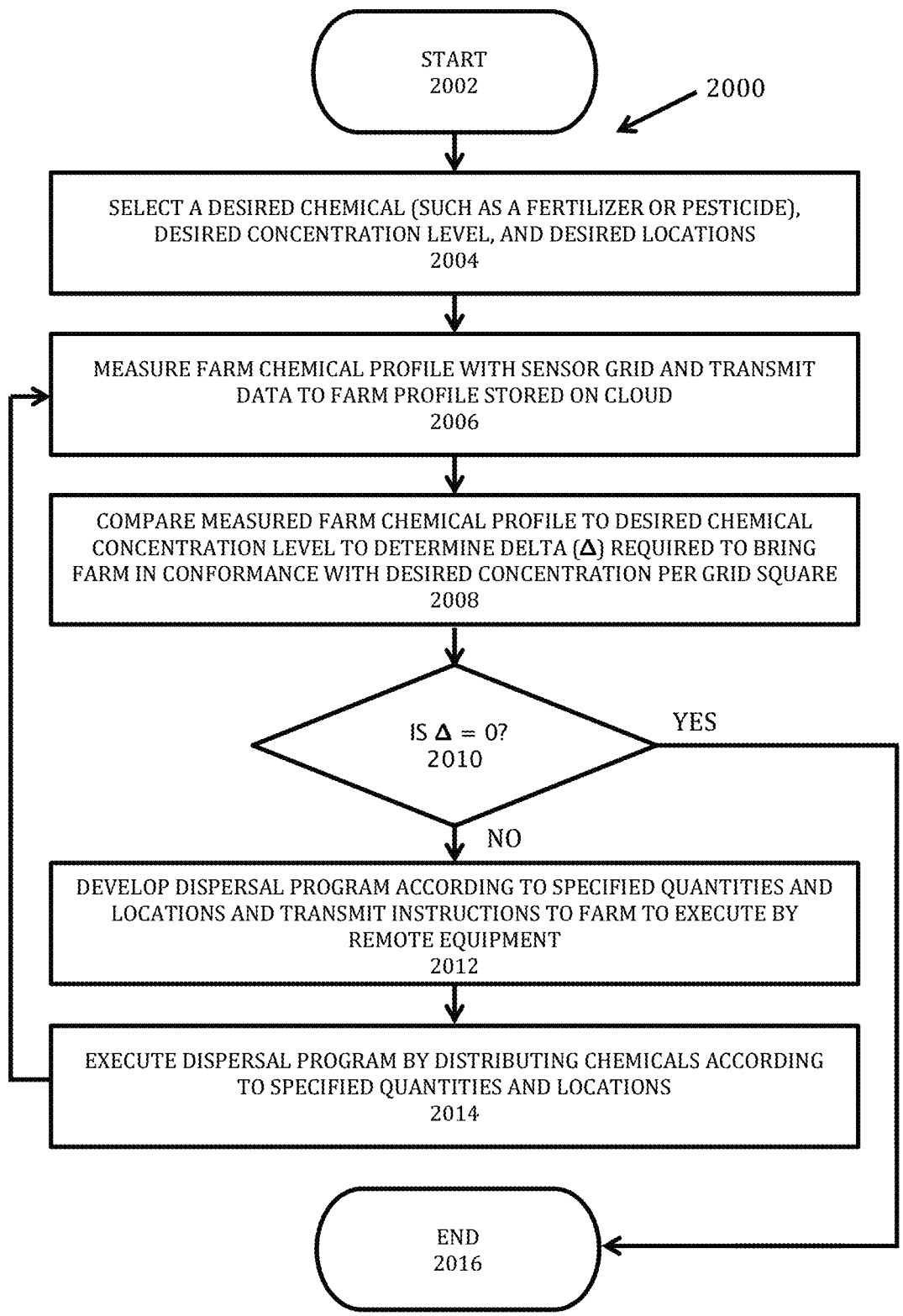
FIG. 8 depicts a flowchart illustrating a computer process flow overview for dispersing chemicals onto a farm with a drone, measuring the resulting concentrations of chemicals actually deposited onto the farm with a chemical sensor array, and then implementing a control feedback loop to correct deviations from an ideal concentration amount.
Figure 9:
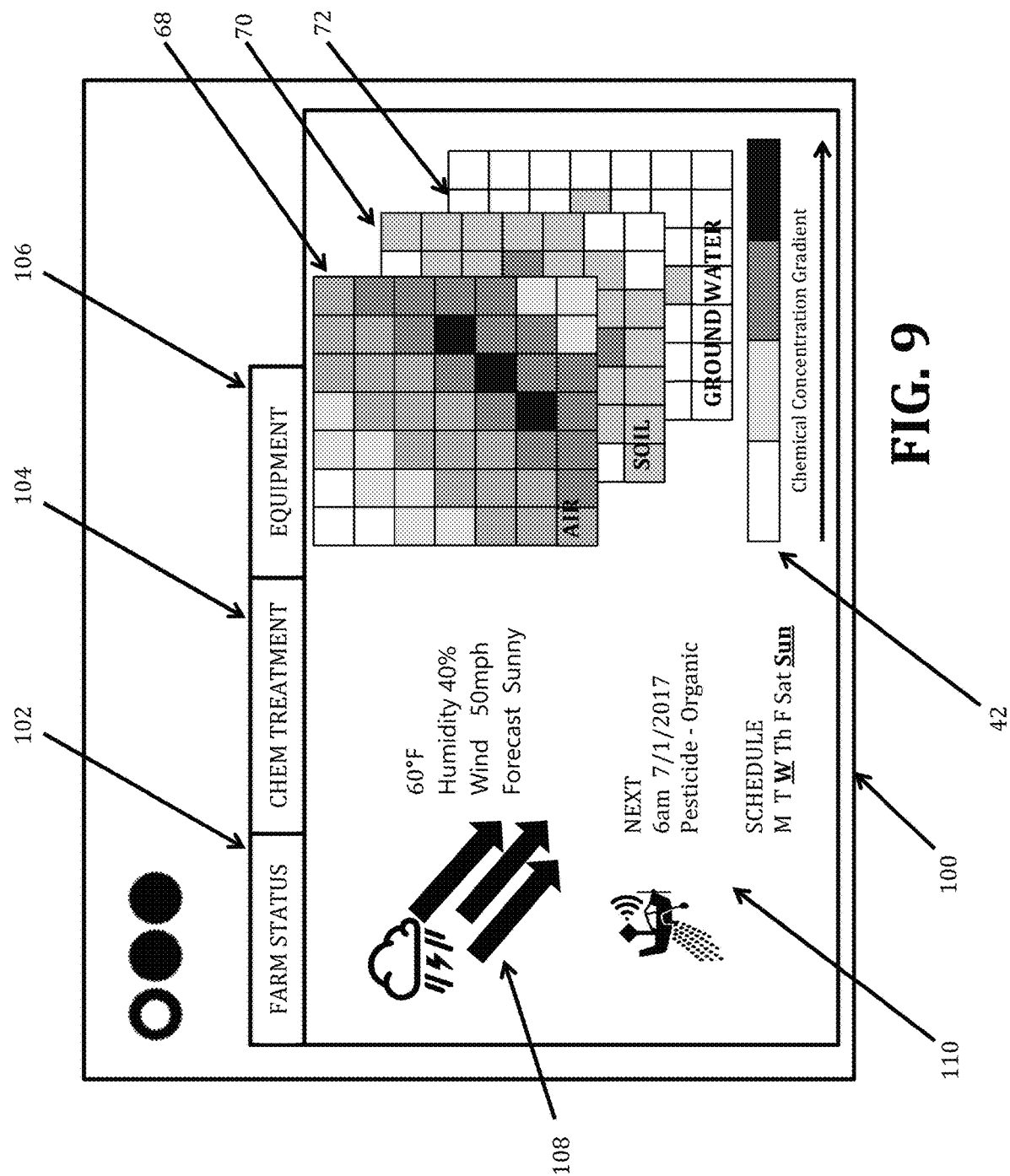
FIG. 9 illustrates a Graphical User Interface (GUI) that includes menu options for farm status, chemical treatments, and equipment displaying a primary user screen illustrating the weather, programmed chemical treatments and equipment, and farm chemical concentrations.
Figure 10:
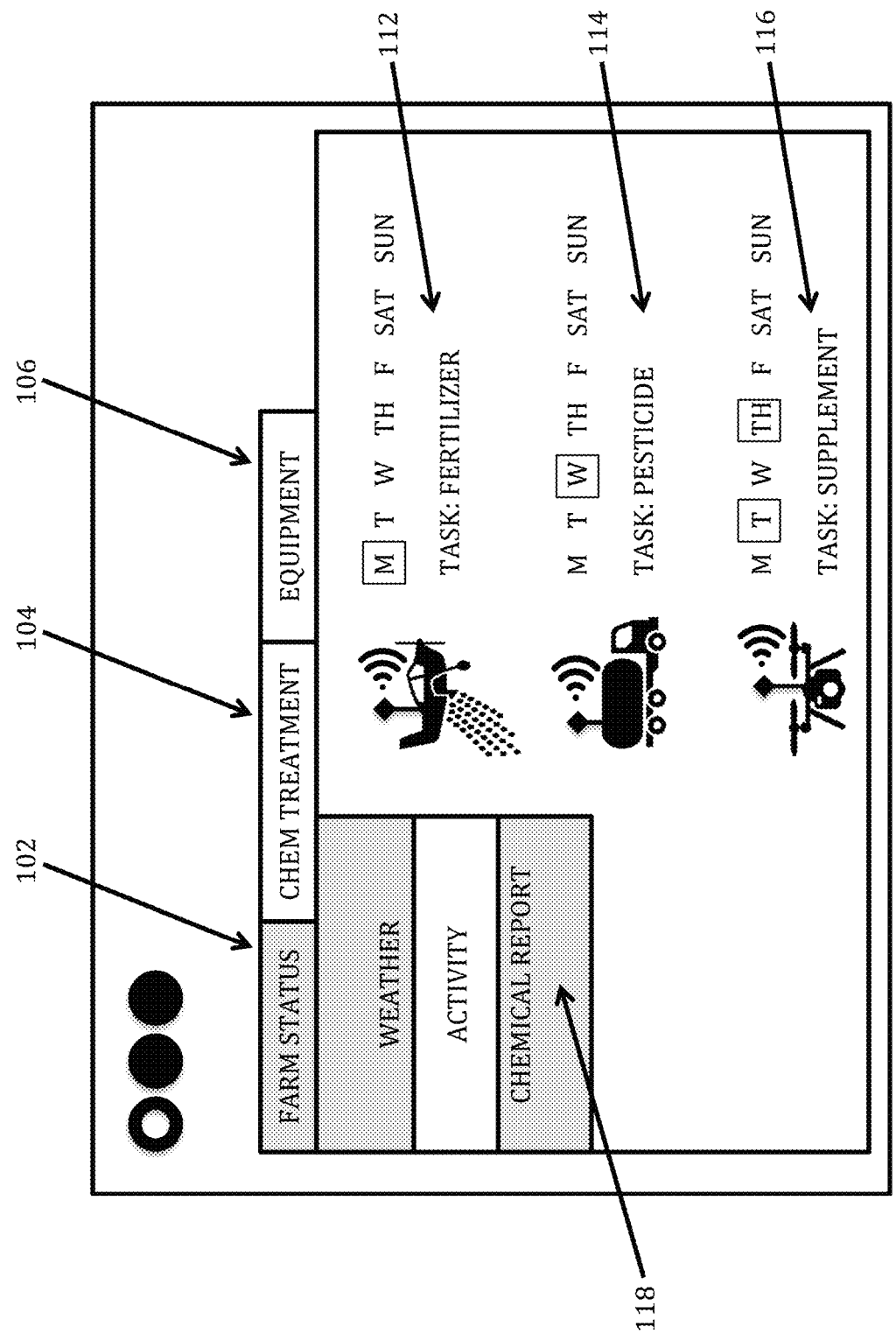
FIG. 10 illustrates a Graphical User Interface (GUI) depicting a programmed chemical dispersing schedule based upon different types of equipment.
Figure 11:
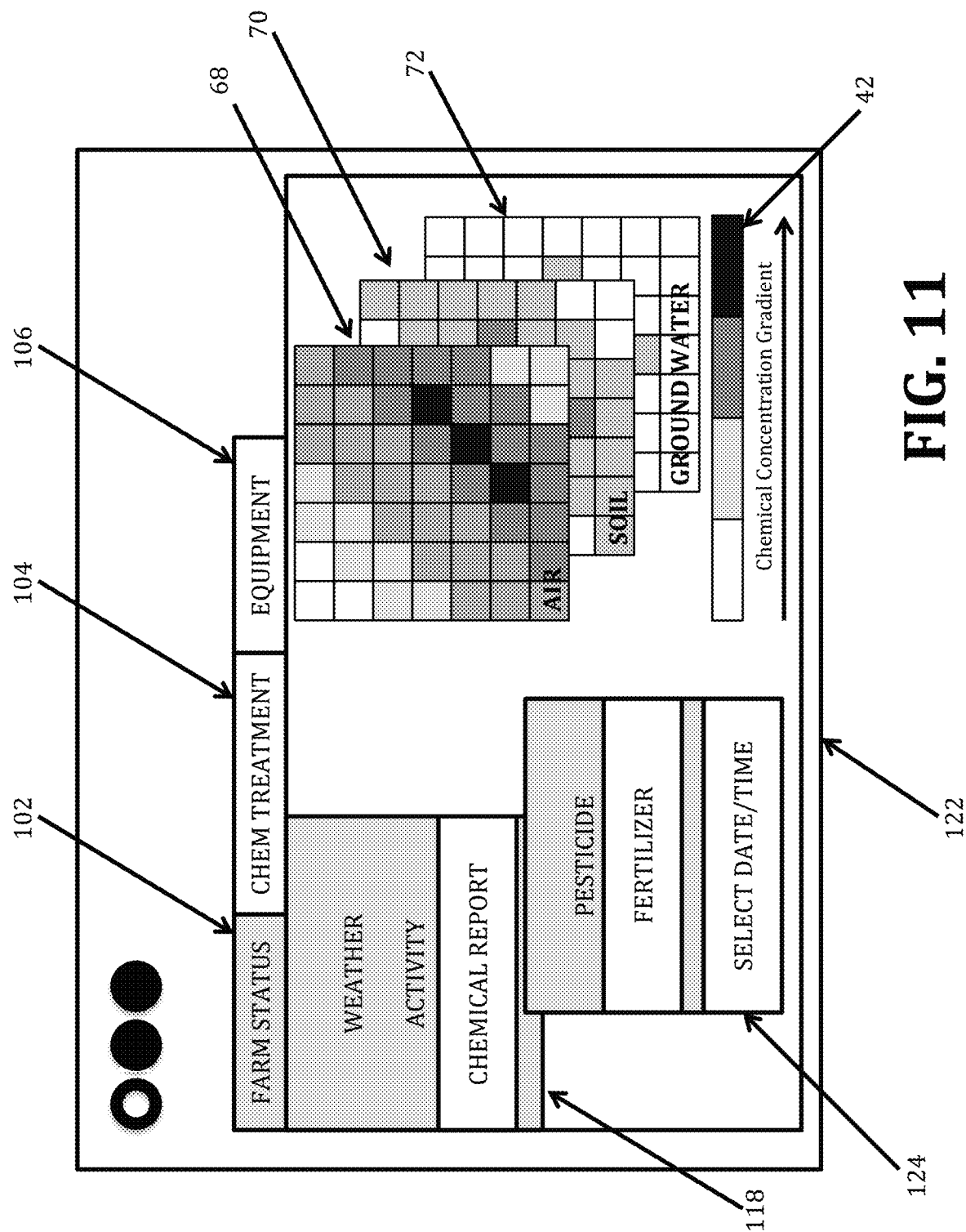
FIG. 11 illustrates a Graphical User Interface (GUI) depicting chemical concentrations for various chemicals based available on measured dates through a calendar picking tool.
Figure 12:
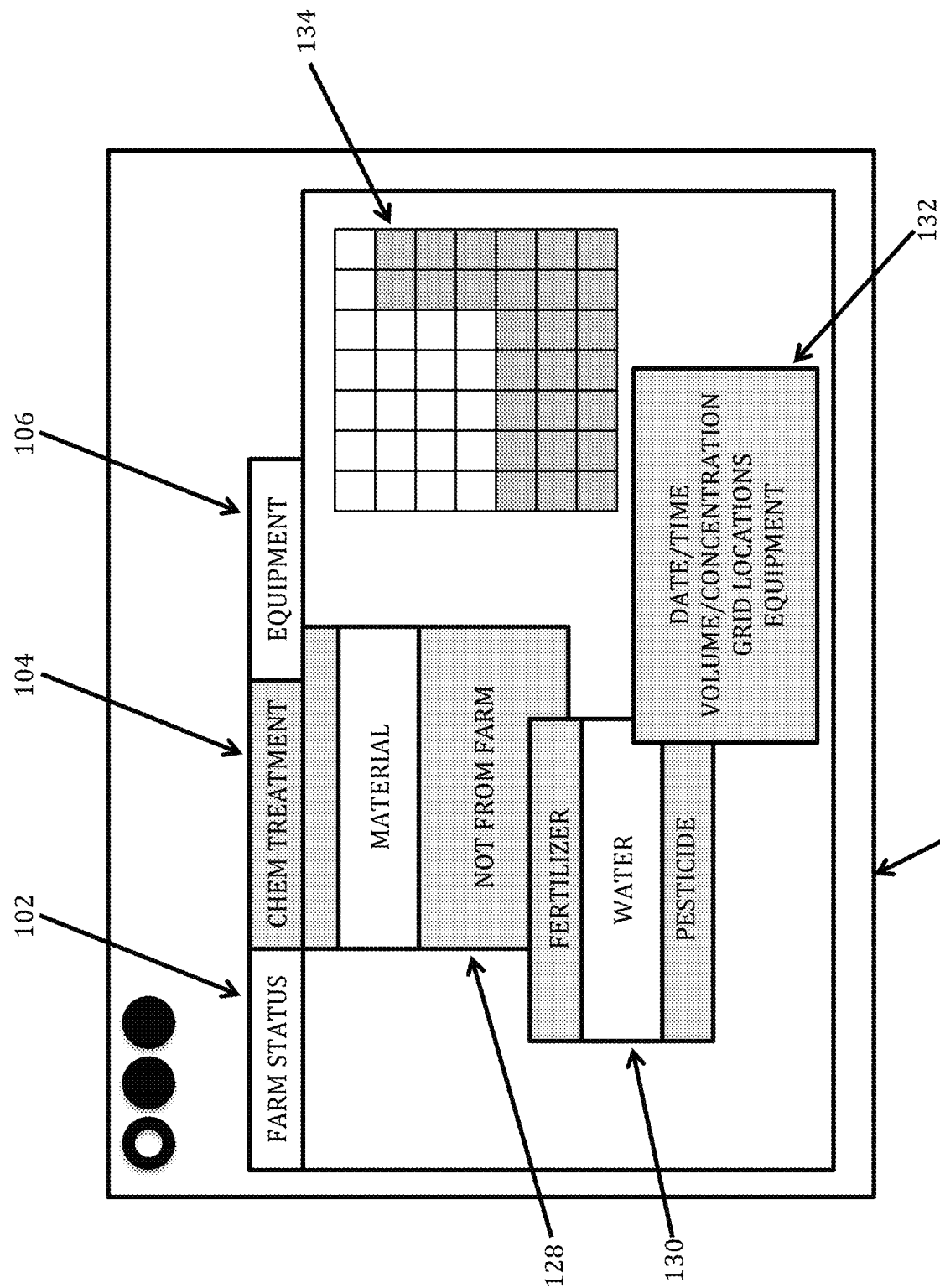
FIG. 12 illustrates a Graphical User Interface (GUI) depicting a sensor grid illustrating available remedial programs to dilute selected portions of a farm with water to dilute chemical concentrations of pesticides or fertilizers.
Figure 13:
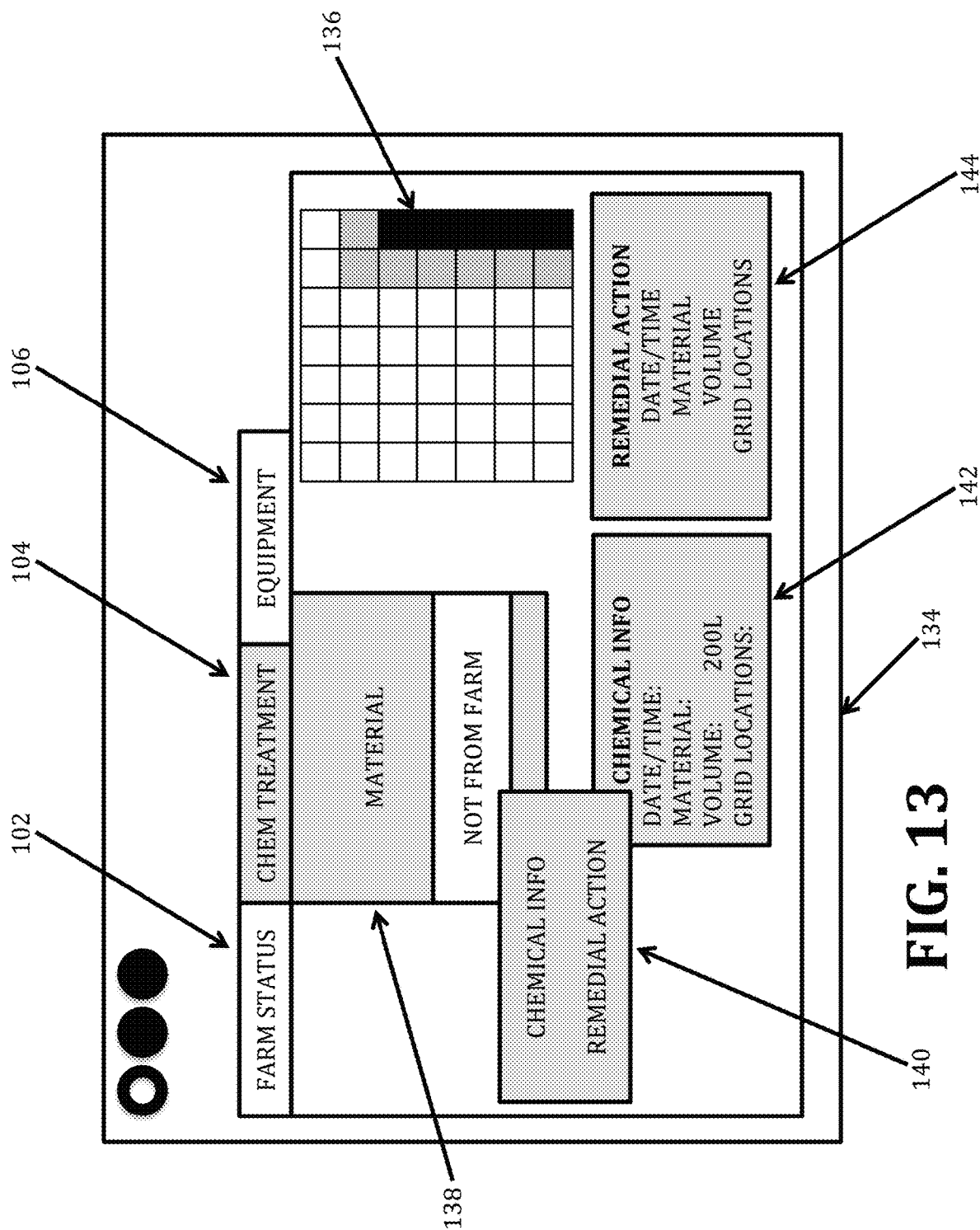
FIG. 13 illustrates a Graphical User Interface (GUI) depicting chemical sensor information depicting trespassing chemicals deposited by other farms onto the present farm along with various trespassing chemical information such as their concentration, chemical type, and location along with recommended remedial actions.
Figure 14:
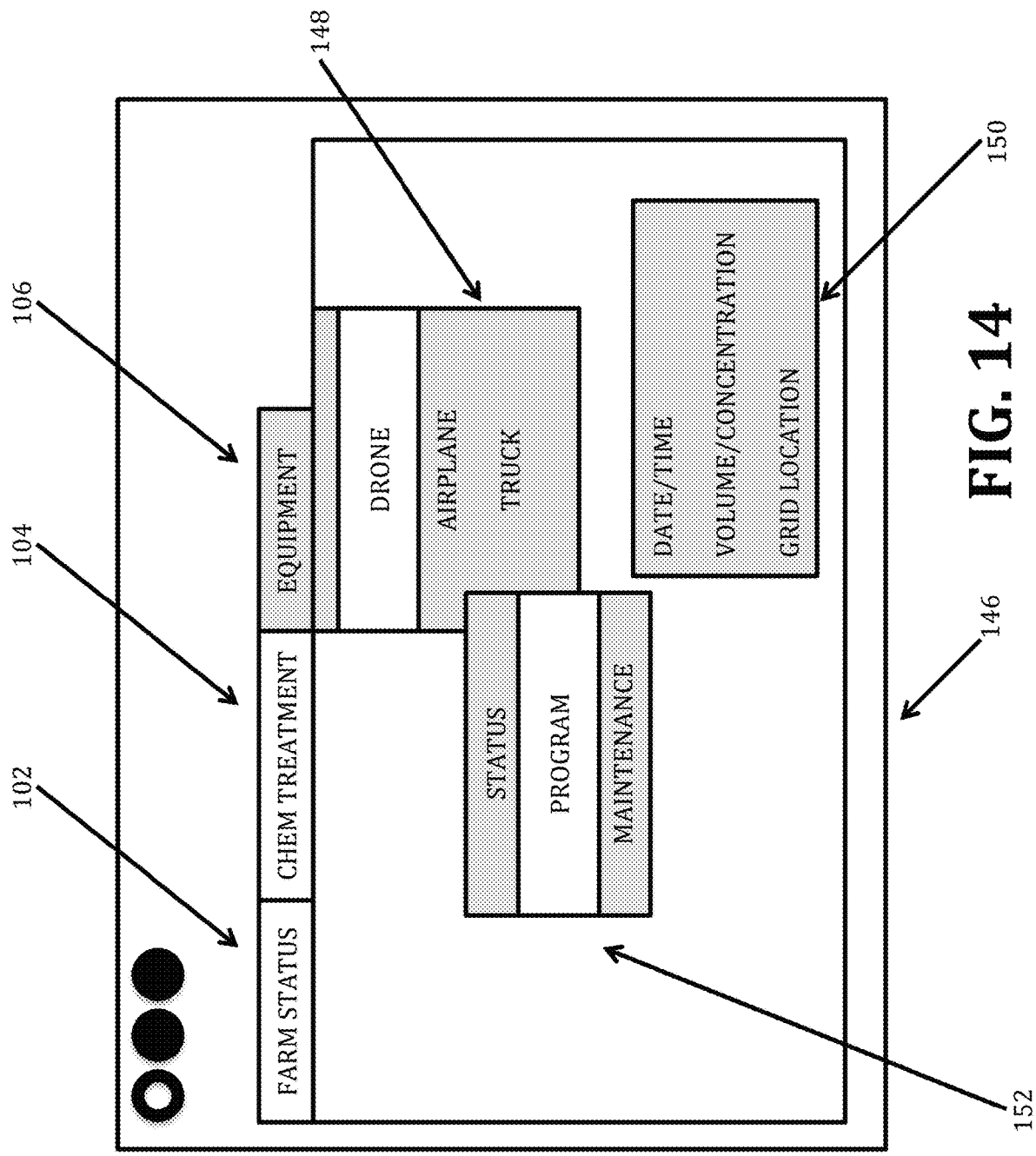
FIG. 14 illustrates a Graphical User Interface (GUI) depicting equipment information as to what devices are available for chemical dispersion along with their available computer management programs.
Figure 15:
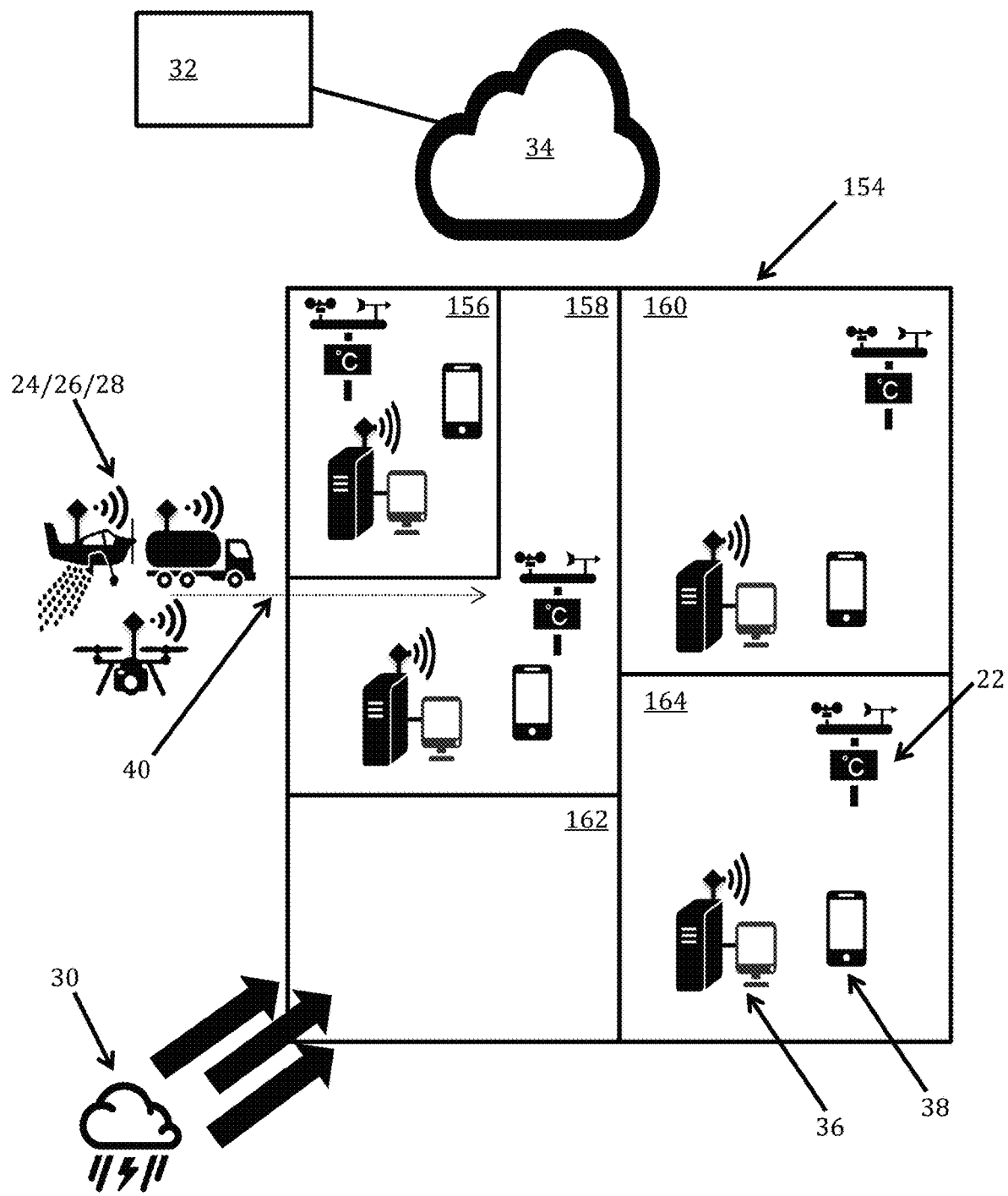
FIG. 15 illustrates a geographic area containing five different farms of different geographic sizes and shapes along with associated equipment for dispensing chemicals with drones, measuring chemicals with chemical sensor arrays, and communicating with a cloud-based social farm chemical control application to regulate the dispensation of chemicals by the drones.
Figure 16:
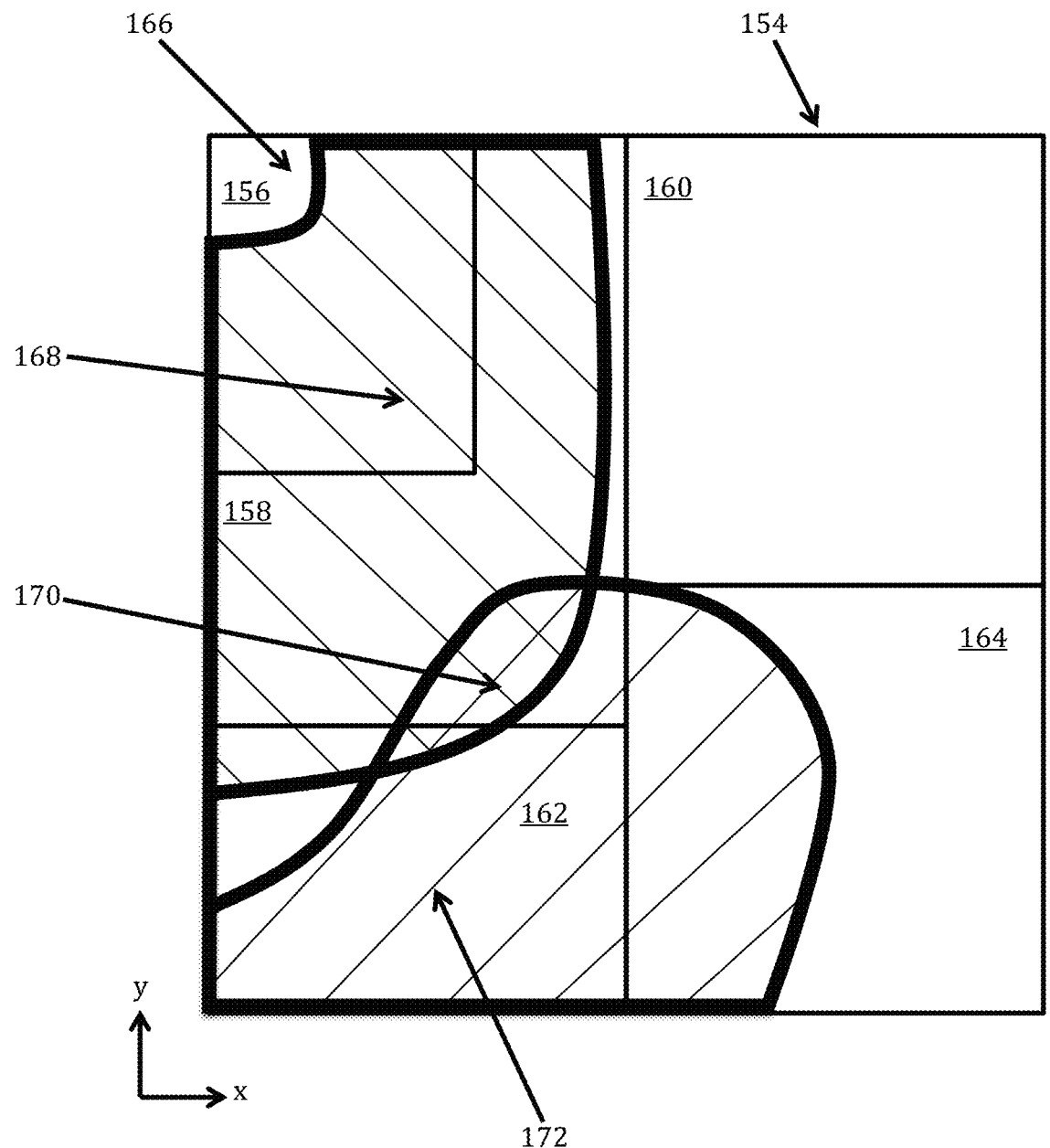
FIG. 16 illustrates a geographic area containing five different farms of different geographic sizes and shapes depicting the chemical dispersion patterns from two different drones from two different farms and the problems caused by the dispersion.
Figure 19:
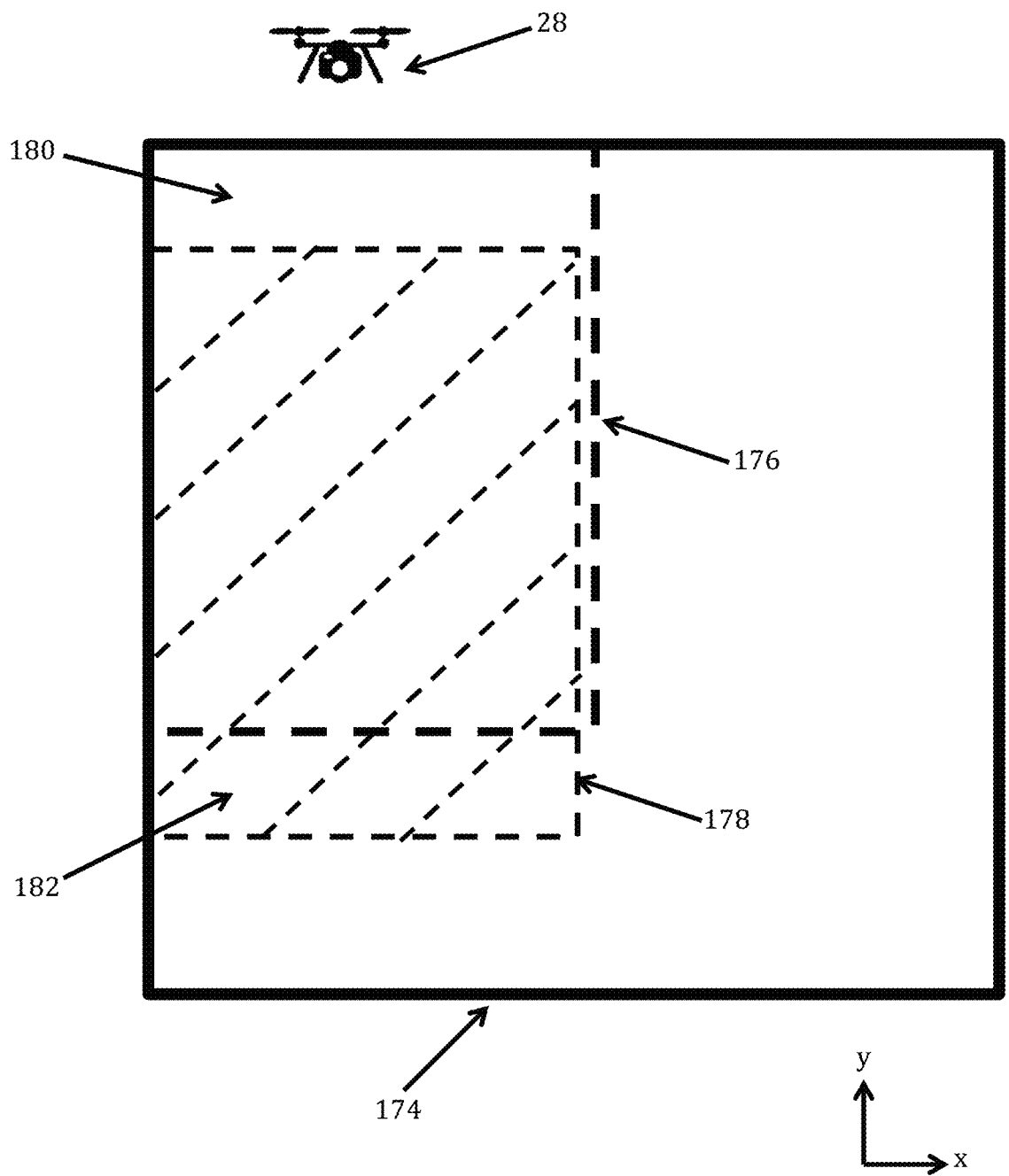
FIG. 19 illustrates a desired area in which a drone is to dispense chemicals and an actual area where the chemicals were dispersed due to weather, ground conditions, or device operation.
Figure 20:
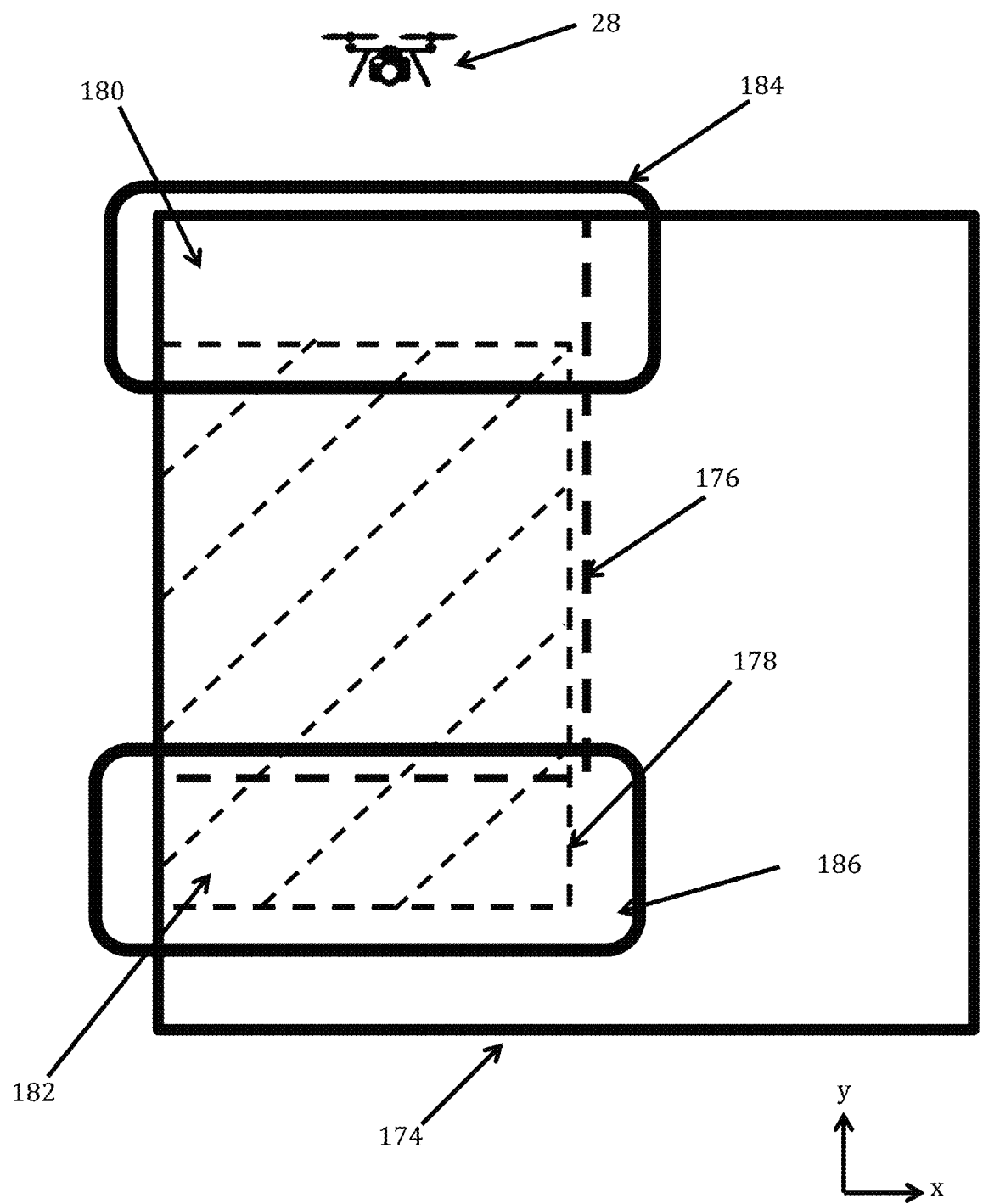
FIG. 20 illustrates the graphical creation of a REVISED DISPERSAL PROGRAM used to add chemicals to a desired area lacking chemicals and a DILUTION PROGRAM used to dilute chemicals in a desired area to reduce the impact of chemicals deposited in the area.
Figure 21:
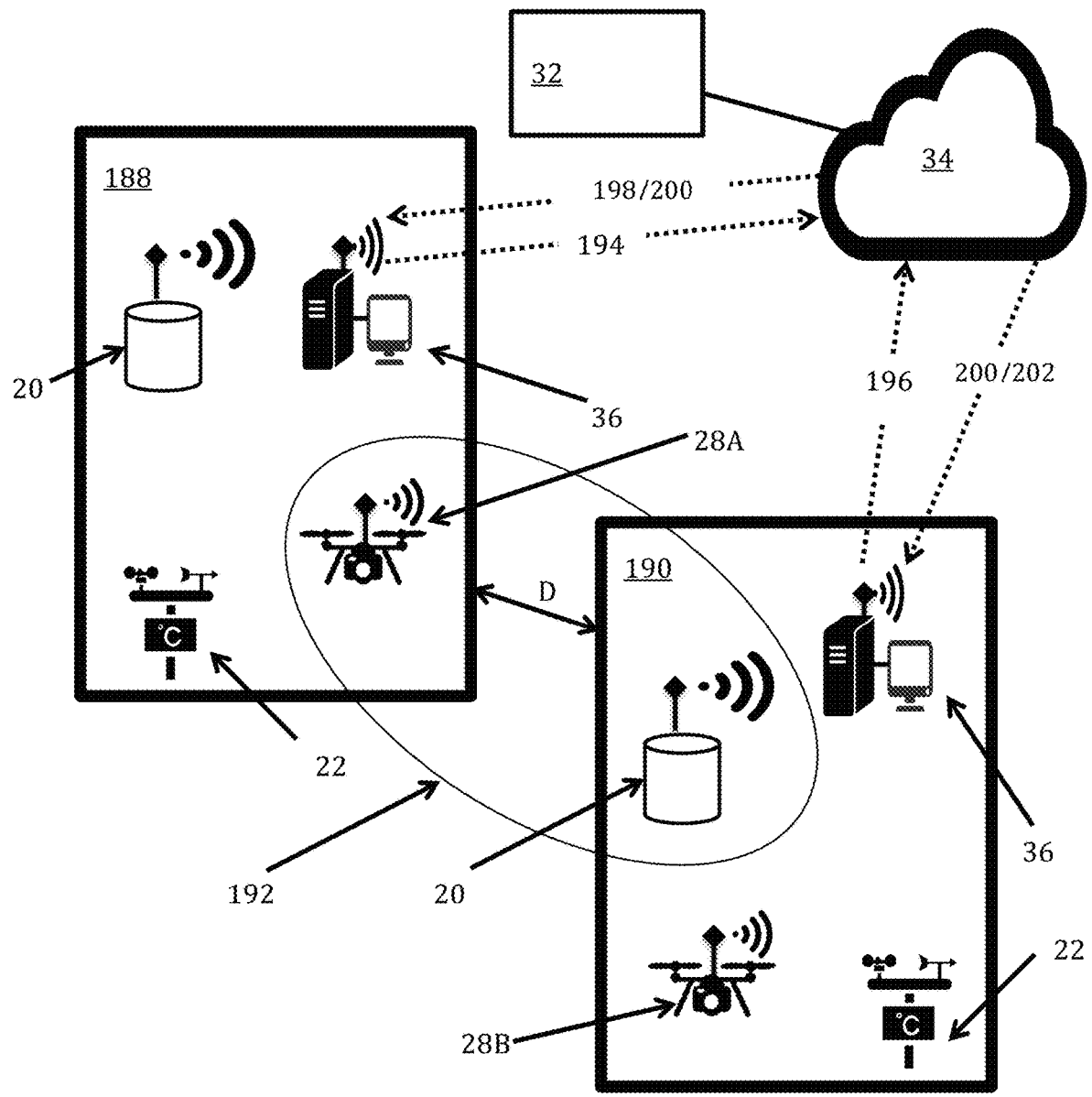
FIG. 21 illustrates a diagram depicting two farms that are a part of the cloud-based social farming network where each one has a programmable chemical dispensing drone and a chemical sensor array.
Figure 22:
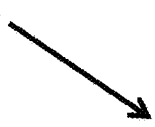
FIG. 22 illustrates an information structure and accompanying data for a DISPERSAL MESSAGE.
Figure 24:
FIG. 24 illustrates an information structure and accompanying data for a TERMINATE DISPERSAL MESSAGE.

While the invention has been shown and described with reference to a particular embodiment thereof, it will be understood to those skilled in the art, that various changes in form and details may be made therein without departing from the spirit and scope of the invention. FIG. 1 illustrates a map depicting a farm 10 containing a grid of chemical sensors 20. Farm 10 is a geographic area of land that is used for agricultural production. It is contemplated that farm 10 may be any size, such as a size greater than ten acres, or less than one-million acres. While farm 10 is shown as having a square shape, farm 18 may have any configuration. Farm 10 is divided into a variety of sub-areas 12, 14, 16, and 18 as shown by dashed lines. These sub-areas represent that farm 10 may support different crops that each have separate needs for water, fertilizer, and pesticides. For example, area 12 may be an orchard for almonds, area 14 may grow avocados (preferably Hass avocados grown in California), area 16 may be left empty as a part of a crop rotation, and area 18 may be an orchard for pecans. Chemical sensors 20 are placed in an array across farm 10 to detect chemicals dispersed onto the farm. Each chemical sensor is coupled to a wireless device for having bi-directional communications with local server/workstation 36. Local server/workstation 36 is there to support wireless communication with the chemical sensor array formed of sensors 20. The illustration of twelve sensors 20 is merely exemplary. Any number of sensors in any geographic configuration may be used in combination with farm 10. Farm 10 may also include a weather station 22 that may wirelessly provide live weather data to server/workstation 36 regarding weather conditions 30, shown as a cloud with rain and lightning heading in a particular direction across farm 10. This weather data may include temperature, air pressure, wind speed and direction, humidity, barometric pressure, and other live weather information. Server/workstation 36 is in bi-directional communication with a primary network system 32 through internet 34. Primary network system 32 supports the storage of all data collected from farm 10 and provides software to control the distribution of chemicals onto farm 10 through computer programmable vehicles such as plane 24, truck 26, or drone 28. For purposes of this invention, any vehicle that is computer programmable for the purpose of distributing chemicals onto farm 10 is referred to as a drone. A drone may include a truck, plane, boat, or other aerial vehicle. A farmer on farm 10 may also access the software on server/workstation 36 or primary network system 32 through mobile device 38. Drones 24, 26, or 28 are programmed to follow a specific path 40 to distribute chemicals onto farm 10. Drones 24, 26 and 28 are programmed to follow a specific path based on information configured into the program by server/workstation 36 utilizing software based on primary network system 32. This program dictates where chemicals are distributed across farm 10 and in what concentrations. The type and concentrations of chemicals will vary based upon the type of crops being grown on farm 10 as indicated by sectional areas 12, 14, 16 and 18 that each contain a different crop or no crop. A farmer may monitor the operation of drones 24, 26 and 28 through mobile device 38 or server/workstation 36. The term farm includes vegetable and grain crops; fruit and nut orchards; grape fields where the grapes may be eaten directly, dried into raisins, or used to produce wine or balsamic vinegar; tree farms; fish farms; free range poultry farms; flower gardens; livestock (cattle, sheep, bison, ostrich, emu, alpaca, llama, elk) ranches; and the like.

FIG. 2 illustrates a map depicting a farm 10 showing a concentration gradient 42 of a chemical dispersed across the farm 10. Pesticides, fertilizers, soil stabilizers, fungicides, water or other chemicals may be distributed across farm 10 by drone 24, which distributed the chemicals via flight path 40. Farm 10 is divided into a series of areas 44 that each contain a chemical sensor. Chemical sensors 20 detect the presence and concentration of chemicals being dispersed by drone 24. Note that drone 24 has a wireless data communication system for bi-directional data communication with server/workstation 36, such as a cell phone link or blue tooth link. Weather 30 may impact the dispersion of chemicals across farm 10. It may be desired that every area 44 of farm 10 have the same concentration of chemicals dispersed by drone 24. However, weather conditions 30, geographic conditions of farm 10 such as hills, valleys, soil types, and rock distribution, as well as hydrological conditions may cause chemicals dispersed by drone 20 to become distributed across farm 10 unevenly as shown by chemical concentration gradient bar 42. Some areas 44 shown in black have a high concentration of chemicals distributed by drone 24. Other areas 44 shown in white have very low or no detectable amount of chemicals present that are distributed by drone 24. As a result, plants in the areas 44 which have a high level of chemical concentration (shown by a darker color) may have their growth stunted due to too much fertilizer. Similarly, plants in areas 44 which have a low level of chemical concentration (shown by a lighter color) may have their growth stunted due to too little fertilizer. The drone may have a microcomputer such as an ARDUINO®, RaspberryPi, and the like, which could interface with a serial Bluetooth RF (radio frequency) transceiver module (also called a shield) to communicate with an on-board ANDROID® smartphone for long range bi-directional communications. The ARDUINO® and RaspberryPi microcomputers have memory to store a compiled program for data acquisition and for the storage of said acquired data. The ARDUINO® and RaspberryPi microcomputers also interface with these sensors: thermal, methane, infrared, ultraviolet, and the like. A spectrophotometer can be interfaced with the ARDUINO® to look for definitive colors which would indicate such things as ripening fruit, a mold infection, a dying plant, and the like. The ARDUINO® and RaspberryPi also have camera interfaces, allowing pictures to be taken.

FIG. 3 depicts a sectional view of a tree 54 on a farm 10 showing its trunk and branches above ground 56 with roots 58 below ground 56 dipping into groundwater 60 along with a chemical sensor system 20 having airborne 48, soil based 50, and groundwater based 52 sensors. Sensor system 20 has a wireless antenna 46 that facilitates bi-directional data communications with server/workstation 36. Server/workstation 36 may push out various software and firmware updates to sensor system 20. Sensor system 20 may provide all sensor data collected to server/workstation 36. Aerial sensor 48 may be made of LIDAR for detecting the presence of clouds of chemicals in the air above tree 54. Aerial sensor 48 may also be a camera to visually identify the presence of airborne clouds of chemicals or to particularly identify types of chemical granules visually on a surface. Aerial sensor 48 may also be a thermal imaging camera to monitor and identify chemicals deposited by a drone due to the different absorbent heat capacities of chemicals. Other various chemical sensor systems for detecting the presence and type of chemicals are well known in the art and exist in many varieties. Soil sensor 50 and groundwater sensor 52 may be formed of a direct-reading chemical sensor that functions by detecting and rapidly responding to the presence or concentration of an analyte at an interface between the sensor and a sample matrix containing the analyte. This direct-reading chemical sensor may be an electrochemical sensor or include an optical fiber. Sensor 20 may also include a sensor that uses chromatographic, spectroscopic, ultra-violet sensors, infra-red sensors, or electrophoretic process to identify the chemical. The fact that sensor 20 may detect chemicals in the air, ground, and groundwater enables sensor 20 to provide a holistic chemical profile of farm 10 as it affects plants 54 to ensure that plants 54 receive the optimal level of desired chemicals throughout the environment in which plant 54 is capable of interacting with chemicals dispersed by drone 24.

FIG. 4 illustrates a set of chemical concentration grids for the air, soil and groundwater for an ideal programmed concentration 62, 64, and 66, and an actual measured concentration 68, 70, and 72. The chemical concentration is shown by the shaded concentration of each square as shown by gradient 42, where white shows little or no chemical concentration and black shows the highest concentration. For example, in grid 62, the air may have a high desired concentration of chemical for a pesticide. Grid 64 may show that the ground has a lower desired concentration of chemical for the pesticide. Grid 66 may show that the groundwater has a desired concentration of no presence of pesticide that could contaminate the water table. However, weather, drone error, geographic conditions, hydrological conditions, or other environmental factors may cause the chemicals to become deposited in areas in concentrations that vary from the ideal desired concentrations shown in grids 62, 62, and 66. For example, in grid 68, the measured concentration of chemicals is shown as undesirably high as shown in dark grey and black in several areas in the bottom right of grid 68. Similarly, in grid 68, the measured concentration of chemicals is shown as undesirably low as shown in light grey and white in several areas in the upper right of grid 68. The impact of the environmental factors upon the distribution of chemicals onto farm 10 is similarly shown in the actual distribution of chemicals on the soil in grid 70 and groundwater 72. Knowing the actual distribution of chemicals in the air, ground, and water table allows a farm to correct for these deviances in desired chemical concentration through adding more chemicals in areas of low concentration or trying to dilute or otherwise mediate areas of high concentration with a chemical that dilutes or deactivates the chemical that is in too high of concentration.

FIGS. 5-7 depicts a flowchart 1000 illustrating a computer process for dispersing chemicals onto a farm with a drone 24, 26, or 28. The computer process measures the resulting concentrations of chemicals actually deposited onto the farm 10 with a chemical sensor array formed of sensors 20. The computer process then implements a control feedback loop to correct deviations from an ideal concentration amount. The process begins with START 1002. In step 1004, the system measures the farm chemical profile with the sensor grid formed of sensors 20. This chemical information is transmitted to form a farm profile that is stored in the cloud on system 32. In step 1006, a user uses cloud-based software from system 32 through mobile device 38 or server/workstation 36 to select a desired chemical, such as a fertilizer or pesticide for dispersion onto farm 10 along with a desired concentration level. In step 1008, the user will use cloud-based software from system 32 through mobile device 38 or server/workstation 36 to select portions of the farm 44 using a Graphical User Interface grid to determine what portions of the farm will receive the selected chemical and in what concentration. In step 1010, the chemical sensor array using sensors 20 detects the new chemical concentration of the deposited chemical across the farm after the drone has followed its preprogrammed chemical deposition path depositing the chemical. In step 1010, the system compares the new measured farm chemical profile to the desired preprogrammed chemical concentration level set by the user. The system determines if there is any deviation, shown by a delta (.DELTA.), between the actual measured chemical concentration and the preprogrammed desired concentration. The software supported by cloud-based network 32 and 24 determines what chemical modification is required to bring the measured chemical concentration across farm 10 into conformance with the preprogrammed desired chemical concentration. In step 1012, the system determines whether the chemical concentration is below the desired chemical concentration level, the same as the desired chemical concentration level, or is above the desired chemical concentration level. When the chemical concentration is above the desired chemical concentration level in step 1018, the process proceeds to step 1022 shown in FIG. 6. In step 1024, the user is presented with a warning message that the measured concentration of chemicals is above the desired level. Too high a concentration of chemicals may damage or kill crops. Therefore, the user is then presented with a menu of options through a Graphical User Interface (GUI) on how to dilute the existing high concentration of chemicals through the use of water or a counteracting chemical agent. In step 1026, the user selects the desired treatment to dilute or counteract the undesired high level of chemical concentration from the software GUI menu. In step 1028, the software system based in cloud network 32 creates a DILUTION PROGRAM and transmits the DILUTION PROGRAM to a drone 24, 26, or 28 via cloud 34 and server/workstation 36 identifying the desired dilution material, dilution quantities, and dilution amounts. In step 1030, the dilution program is executed by drone 24, 26, or 28 by distributing dilution materials according to specified quantities and locations across specific preprogrammed areas of farm 10. In step 1032, the chemical sensor array across farm 10 takes further chemical sensor readings with sensors 20 after the execution of the DILUTION PROGRAM and transmits that data to server/workstation 36. In step 1034, the user is presented with the results of the DILUTION PROGRAM based on updated chemical sensor readings and provides additional recommendations for the addition or dilution of the chemical based-upon its measured concentration. The process then ENDS in step 1036. When the chemical concentration is below the desired chemical concentration level in step 1020, the process proceeds to step 1023 shown in FIG. 7. When the measured chemical concentration level is below the desired preprogrammed level, the user is presented with a GUI menu of options by the software from system 32 on how to increase the existing concentration level of chemicals up to the desired level in step 1038. In step 1040, the user selects the desired treatment to increase the chemical concentration, such as sending a drone 24 to go back and deposit additional chemicals in a specified amount in the specific areas 44 that lack the desired amount to bring the concentration up to the desired level. In step 1042, system 32 creates a REVISED DISPERSAL PROGRAM that corrects the under-concentration of chemicals in the specific areas by sending a drone to go back and provide a specific additional dosage of chemicals to bring the chemical concentration in the area back to up the desired preprogrammed level. That REVISED DISPERSAL PROGRAM is then transmitted by system 32 through cloud 34 to server/workstation 36 to drone 24, 26, or 28. In step 1044, the drone 24 executes the REVISED DISPERSAL PROGRAM by distributing chemicals according to specified quantities and locations as set forth by the system in the program. In step 1046, the chemical sensor array across farm 10 takes further chemical sensor readings with sensors 20 after the execution of the REVISED DISPERSAL PROGRAM and transmits that data to server/workstation 36. In step 1048, the user is presented with the results of the REVISED DISPERSAL PROGRAM based on updated chemical sensor readings and provides additional recommendations for the addition or dilution of the chemical based-upon its measured concentration. The process then ENDS in step 1050. Referring again to FIG. 5, when the measured concentration of chemicals by sensor 20 in a given area 44 matches the desired preprogrammed concentration within desired parameters, the system recommends that no further action is taken and ENDS the process in step 1016.

FIG. 8 depicts a flowchart 2000 illustrating a computer process flow overview for dispersing chemicals onto a farm 10 with a drone 24, 26, and 28, measuring the resulting concentrations of chemicals actually deposited onto the farm 10 with a chemical sensor array having sensors 20, and then implementing a control feedback loop to correct deviations from an ideal chemical concentration amount. The process begins with START 2002. In step 2002, a user selects a desired chemical, such as a fertilizer, pesticide, soil remediating material, fungicide, soil stabilizer, water, or other material, a desired concentration level for that chemical, and a desired location to deposit that chemical on farm 10. In step 2006, the chemical sensors 20 forming the chemical sensor array measure existing chemical concentrations across the farm 10 to develop a farm chemical profile by server/workstation 36 and system 32 and stored on cloud 34. The system 32 compares the measured farm chemical profile to desired chemical concentration levels to determine what delta (Δ) is needed to bring the farm in conformance with the preprogrammed desired concentration set by the user per grid square 44. For example, after fertilizer is initially deposited on farm 10, wind and rain may rapidly dilute and disperse the fertilizer in particular areas requiring the deposition of further fertilizer. However, other areas of farm 10 may be shielded from the wind and have limited water flow meaning that the deposition of fertilizer is not impacted much from dilution or dispersion leaving a more durable concentration of fertilizer. Thus, successive depositions of fertilizer must account for the existing concentration of fertilizer on the farm. Areas with high remaining concentration of fertilizer will receive little or no deposition of additional fertilizer from drone 24, where areas of low remaining concentration will receive higher deposition of fertilizer. In step 2010, if the measured concentration of fertilizer on farm 10 matches the desired level of concentration, the process ends in step 2016. If the measured concentration of fertilizer on farm 10 matches the desired level of concentration, then in step 2012, system 32/36 develops a DISPERSAL PROGRAM that specifies specified quantities and locations for the deposition of additional fertilizer. That DISPERSAL PROGRAM is transmitted to farm 10 via cloud 34 and server/workstation 36 for execution by the remote programmable equipment like drones 24, 26 and 28. In step 2014, drone 24, 26, or 28 executes the DISPERSAL PROGRAM by distributing fertilizer onto farm 10 according to programmed quantities and locations. The process then proceeds back to step 2006 to determine whether drones 24, 26, or 28 correctly deposited the chemicals according to the preprogrammed amount as measured by the chemical sensor array. The code or instructions to execute processes 1000 and 2000 may be stored on a Hard Disk Drive (HDD); a Solid-State Drive (SSD); Electrically-Erasable, Programmable, Read-Only Memory (EEPROM); Random Access Memory (RAM); Compact Disk (CD); Digital Versatile Disk (DVD); Blu-Ray disc (BD); magnetic tape; a cloud; and the like.

FIGS. 9-14 illustrate a Graphical User Interface (GUI) supported by system 32, cloud 34, server/workstation 36, and mobile device 38. FIG. 9 illustrates a Graphical User Interface (GUI) 100 that includes menu options for farm status 102, chemical treatments 104, and equipment 106 displaying a primary user screen illustrating the weather 108, programmed chemical treatments and equipment 110, and farm chemical concentrations 68, 70, and 72 as indicated by concentration bar 42. A farmer user can access GUI 100 through server/workstation 36, mobile device 38, or any other computing device that has access to cloud 34. Weather information 108 provides a holistic weather report for the farmer. Chemical deposition report 110 provides the farmer user with the next scheduled chemical deposition showing the date and time of the deposition, the chemical to be deposited onto farm 10, the type of equipment to be used, and the weekly schedule for the deposition upon which it occurs as indicated by bold underline. Grids 68, 70, and 72 show the current chemical concentration based on the type of chemical the user is interested in. These grids can rapidly alert the farmer user to areas of the farm 10 that are being poisoned by too much fertilizer or pesticides.

FIG. 10 illustrates a Graphical User Interface (GUI) 120 depicting a programmed chemical dispersing schedule based upon different types of equipment. Under the farm status menu 102, the farmer user can get a weather report, see what deposition activity is happening on the farm, and in this figure can see the chemical deposition activity that is occurring on farm 10. In section 112, airplane drone 24 is shown having the task of dispersing fertilizer on farm 10 on Mondays as shown by the box on the M in the weekly calendar. In section 114, chemical truck 26 is shown as having the task of dispersing pesticides on Wednesdays as shown by the box on the W in the weekly calendar. In section 116, the drone is shown as having the task of dispensing a soil supplement on Tuesdays and Thursdays as shown by the box on the T and TH in the weekly calendar.

FIG. 11 illustrates a Graphical User Interface (GUI) 122 depicting chemical concentrations for various chemicals based on available measured dates through a calendar picking tool 124. Under the chemical report selection 118 of menu 102, the farmer user can see what chemicals are deposited across the farm 10 and in what concentrations on a particular date as the chemical sensor array is working year-round. This allows the farmer user to gather historical data regarding chemical dispersal on farm 10 and more intelligently manage chemical dispersal on farm 10 through accounting for environmental, growing, and planting seasons and growing and planting seasons. Here menu selection 118 allows the farmer user to look at either pesticides or fertilizers for a selected date and time. The farmer user, having selected fertilizer in this case, can then view grids 68, 70, and 72 to see what the fertilizer concentration is in the air on grid 68, the soil on grid 70, and the groundwater in grid 72. A concentration gradient bar 42 is provided to illustrate the chemical concentration levels shown in grids 68, 70, and 72.

FIG. 12 illustrates a Graphical User Interface (GUI) 126 depicting menu selections for chemical treatments 104 based on materials and based on whether the chemical was from another farm. A grid 134 illustrates concentrations of chemicals on the farm to help the farmer user decide on a chemical treatment. The user can also select fertilizers or pesticides to add additional chemicals where chemical concentrations are too low as shown by grid 134. The user can also select water where chemical concentrations are too high to dilute the chemical, or where the ground is too dry and the crops need watering. With menu selection 132, the user can select the date/time for the chemical treatment, the type of chemical for the chemical treatment as well as its volume and concentration, the grid locations on the farm that are to receive the chemical treatment, and the type of drone 24, 26, or 28 to be used for the chemical treatment.

FIG. 13 illustrates a Graphical User Interface (GUI) 134 depicting chemical sensor information depicting trespassing chemicals 136 deposited by other farms onto the present farm along with various trespassing chemical information such as their concentration, chemical type, and location along with recommended remedial actions. Here in menu 104, the farmer user can see what chemicals are on farm 10 that came from other farms. A major problem with farming today is some farms are being poisoned by too many chemicals being blown or washed over from other farms. Here the user can use menu selection 140 to see the information on the chemicals being deposited from other farms along with recommended remedial actions. Menu selection 142 shows the chemical information such as the date/time, type of material, volume and concentration of the foreign chemical, and the locations on the farm where the chemicals are deposited. Menu selection 144 shows recommended remedial actions generated by system 32 along with the date/time for those actions, the remedial material to be used such as water, the volume of water to be used, and the grid locations on the farm 10 to receive that remedial material. Grid 136 shows the locations and concentrations on the farm 10 that have chemicals deposited by other farms.

FIG. 14 illustrates a Graphical User Interface (GUI) 146 depicting equipment information as to what devices are available for chemical dispersion along with their available computer management programs. Under the equipment menu 106, the user can view the drone 28, the airplane 24, or the truck 26. Once the user has selected one of the pieces of equipment such as the drone 28, the user in menu 152 can view the status of the equipment such as whether it is operational, currently dispensing chemicals, or in repair. The user can view the maintenance schedule of the device in menu 152. The user can select the program of the drone 24 in menu 152. The program selection shown in 150 shows the operational program of the device and is programmable by the user through GUI 146. These program parameters can include the date/time of the desired dispersal date, the volume/concentration and type of chemical to be dispersed, and the grid locations 44 on farm 10 that are to receive the chemical. This information in menu 150 are developed into a DISPERSAL PROGRAM that is used by drone 24 to execute dispersal of chemicals.

FIG. 15 illustrates a geographic area 154 containing five different farms 156, 158, 160, 162, and 164 of different geographic sizes and shapes along with associated equipment for dispensing chemicals with drones 24, 26, and 28. Farms 156, 158, 160, and 164 all have the ability to measure chemical concentrations with chemical sensor arrays that have sensors 20. These chemical sensor arrays and drones are communicating with a cloud-based social farm chemical control application to regulate the dispensation of chemicals by the drones through cloud 34, server/workstations 36, and system 32. It is highly desirable for a single farm to be able to measure chemicals within its boundaries and then make appropriate choices on whether deposition of further chemicals is needed and in what concentrations. However, when multiple farms in a geographic region are in communication on the same social agricultural chemical management system, it is possible to have a more effective chemical control system. For example, drone 24 may be operating on farm 156 to dispense fertilizer on farm 156. However, weather 30 may be blowing all of that fertilizer onto farm 158. With this system the chemical arrays on 156 and 158 can provide live real-time chemical sensor information back to system 32 forming a control loop on how the fertilizer being deposited by drone 24 is actually being deposited onto the farms 156 and 158. In this case, where all of the fertilizer meant for farm 156 is ending up on farm 158, the chemical sensor arrays formed of sensors 20 located on farms 156 and 158 will report live real-time chemical information back to the cloud-based system 32/34 through server/workstations 36 located on each farm. Here, the chemical sensor array for farm 156 will report that no fertilizers are being deposited and the chemical sensor array for farm 158 will report that it is getting the fertilizer meant for farm 156. In this case, cloud-based system 32/34 can correlate that drone 24 operating for farm 156 is causing the fertilizing deposition on farm 158 and can send a message to drone 24 to cease operation or revise its flight path to prevent further deposition of unwanted fertilizer on farm 158. By different farms operating chemical sensor grids and chemical dispensing devices collaboratively through cloud 34, it is possible to do a better job of dispensing chemicals on only those farms that want them while avoiding the farms that do not want them. Note that not all farms in an area, such as farm 162, need to participate in this cloud-based chemical control system to improve the accurate and precise deposition of chemicals on a farm.

FIG. 16 illustrates a geographic area 154 containing five different farms 156, 158, 160, 162, and 164 of different geographic sizes and shapes depicting the chemical dispersion patterns 168 and 172 from two different drones from two different farms and the problems caused by the dispersion, which in this case is a region 170 that receives a double dose of chemicals. In this example, a first drone operating on farm 156 is programmed for depositing chemicals onto just the area of farm 156 only. The area 168 is the actual area where the first drone deposited chemicals due to various environmental conditions. Note that area 168 extends far beyond the borders of farm 156. Also note that area 168 where chemicals are deposited by the first drone missed an area 166 of farm 156 where no chemicals are deposited. Thus, the deposition of chemicals by the first drone was not accurate and precise and does not include all of farm 156 and extends far beyond farm 156, both of which are highly undesirable. A second drone is programmed to deposit chemicals onto farm 162 only. However, environmental conditions prevent the deposition of chemicals onto farm 162 only. The actual deposition of chemicals by the second drone is shown by area 172. Note that some portions of farm 162 receive no chemical deposition by the second drone or the first drone. However, there is a region 170, primarily on farm 158, that receives a double dose of chemicals from both the first and second drones. Here farm 158 is receiving huge amounts of chemicals from neighboring farms, which would hugely impact the amount of chemicals farm 158 should deposit. It is therefore desirable for the various farms in region 154 to have a social network where they can communicate with each other as to what chemicals they are using on their farms along with arrays of chemical sensors to determine where those chemicals are actually going. Through getting communal knowledge of this information and feedback control from the chemical sensor arrays, the farms in region 154 can do a more accurate and precise job of depositing chemicals onto their individual farms 156, 158, 160, 162, and 164.

FIG. 17 illustrates a process flow diagram 3000 depicting a process for operating a chemical control-loop on dispersing chemicals onto a farm 154, 156, 158, 160, and/or 162 within a neighborhood of farms 154 using chemical dispensing drones 24, 26, and 28 in communication with a cloud-based application 32/34 that is also in communication with chemical sensor arrays located on each farm 154, 156, 158, 160, and/or 162 for detecting and measuring dispensed chemicals. The process begins in step 3002 where the DISPERSAL PROGRAM is created and uploaded to the drone, which is the mobile dispersal system from the control system that is a part of the software on system 32. Step 3004 concerns dispersal of chemicals onto the first farm. In step 3004, the drones 24, 26, and 28 have on-board GPS sensors that constantly monitor the position and movement of the drones. Drones 24, 26, and 28 also have chemical dispersal meters that measure the volume and rate of chemical materials being dispersed in conjunction with the sensed GPS information. In step 3004, the system measures dispersal information from the drone with on-board GPS system and metered chemical dispersal system. In addition, the system measures chemical dispersal from the ground with the first array of chemical sensors on the first farm and the second array of chemical sensors on the second farm. Step 3006 concerns gathering data from the first and second chemical sensor arrays located on the first and second farms. Here, the control system on cloud-based system 32 gathers GPS system information and metered dispersal system information from the drone, which is the mobile dispersal system.

The control system also gathers chemical detection information from the first array of chemical sensors from the first farm and the second array of chemical sensors from the second farm. Step 3008 concerns the action taken by the control system in the cloud-based system 32. In step 3008, system 32 determines location and concentration of dispersed material across first and second farms. System 32 then creates a revised dispersal program for the first farm to correct under and over dispersal of chemical material in particular grid locations as needed. System 32 then creates remedial dispersal program for the second farm to correct dispersal of material meant for first farm as needed. Step 3010 concerns the development and uploading of REVISED DISPERSAL PROGRAMS to the drones supporting the first and second farms. A first REVISED DISPERSAL PROGRAM is created for the first drone supporting the first farm to correct and over or under dispersal of chemicals on the first farm only. A second REVISED DISPERSAL PROGRAM is created for the second drone supporting the second farm to correct and over or under dispersal of chemicals on the second farm only.

FIG. 18 illustrates a process flow diagram 4000 depicting a process for operating a chemical control-loop on dispersing chemicals onto a first and second farm 154, 156, 158, 160, 162, or 10 within a neighborhood of farms 154 using chemical dispensing drones 24, 26, or 28. In step 4002, a first drone executes a chemical dispersal program to disperse a chemical onto a first farm according to preprogrammed instructions. In step 4004, data is gathered directly from the first drone as to its GPS position and path along with metered information and the volume and rate chemicals were dispersed from the first drone. Also, chemical data is collected from the chemical sensor array of sensors 20 located on the first and second farms. In step 4006, system 32 determines what materials were actually dispersed where on the first and second farms. Then in step 4006, system 32 creates a REVISED DISPERSAL PROGRAM/DILUTION PROGRAM for the first and second farms to take corrective action to remedy the under or over deposition of chemicals on the first farm and the unwanted deposition of chemicals from the first farm drone onto the second farm. In step 4008, this REVISED DISPERSAL PROGRAM/DILUTION PROGRAM is uploaded to the first and second drones for operation on the first and second farms respectively.

FIG. 19 illustrates a desired area 176 in which a drone 28 is to dispense chemicals and an actual area 178 where the chemicals were dispersed due to weather, ground conditions, or device operation. In farm 174, a user may select a specific area 176 where chemicals are to be deposited. Environmental conditions or other conditions may cause drone 28 to deposit chemicals in area 178. As a result, there is a region 180 of area 176 that receives none of the chemicals from drone 28 as it is supposed to. Also, as a result, area 182 of region 178 receives chemicals from drone 28 that it was not supposed to thereby, creating the need for a REVISED DISPERSAL PROGRAM/DILUTION PROGRAM to remedy the chemical deposition errors in regions 180 and 182.

FIG. 20 illustrates the graphical creation of a REVISED DISPERSAL PROGRAM used to add chemicals to desired area 180 lacking chemicals and a DILUTION PROGRAM used to dilute chemicals in a desired area 182 to reduce the impact of chemicals deposited in the area. Here, system 32 will identify the lack of desired chemicals in region 180 and create a REVISED DISPERSAL PROGRAM 184 configured to deposit a sufficient amount of additional chemical to bring the desired measured chemical concentration level to the preprogrammed desired amount. System 32 will also identify the over-deposition of chemicals in region 182 and create a DILUTION PROGRAM 186 for region 182 to dilute or otherwise remedy the unwanted presence of chemicals in that area.

FIG. 21 illustrates a diagram depicting two farms 188 and 190 that are a part of the cloud-based social farming network 32/34 where each one 188 and 190 has a programmable chemical dispensing drone 28A and 28B and a chemical sensor array 20. In this example, first drone 28A located on farm 188 is preprogrammed with server/workstation 36 to disperse a chemical within the geographic boundaries of farm 188 only. The region that the chemicals from first drone 28A on farm 188 are actually deposited is shown by region 192. Farms 188 and 190 may abut each other or be separated by a distance D. D may have a value of zero. D may have a value of less than one mile. D may have a value of more than one mile. Farms 188 and 190 may individually have a size larger than ten acres. Farm 188 and 190 may have a size less than one-million acres. Farms 188 and 190 may have any size above one-million acres or below ten acres. Before first drone 28A starts to execute the DISPERSAL PROGRAM and disperse chemicals onto farm 188, drone 28A transmits a DISPERSAL MESSAGE 194 to the cloud-based system 32/34. DISPERSAL MESSAGE 194 alerts the cloud-based system to the fact that first drone 28A is going to disperse chemicals onto the first farm. The DISPERSAL MESSAGE includes timing information, location data, farm information, chemical information, and weather information. While the first drone 28A disperse chemicals, part of the dispersal area 192 falls onto the second farm 190 where it is detected by the chemical sensor 20 located on second farm 190. The chemical sensor 20 located on second farm 190 alerts the system 32/34 that unwanted chemicals are being found on the second farm through a CHEMICAL TRESPASS ALERT message 196 transmitted by server/workstation 36 located on second farm 190. The CHEMICAL TRESPASS ALERT message 196 includes timing information, location information, farm information, chemical information and weather information. In response to receiving CHEMICAL TRESPASS ALERT message 196, cloud-based system 32/34 correlates available data, such as that received from DISPERSAL MESSAGE 194 to determine which drone from which farm is depositing unwanted chemicals onto second farm 190. Once system 32/34 determines that it is the first drone 28A from farm 188 that is depositing the unwanted chemicals onto the second farm 190, system 32/34 generates a TERMINATE DISPERSAL MESSAGE 198 that is transmitted to first drone 28A through server/workstation 36 on the first farm 188. The TERMINATE DISPERSAL MESSAGE 198 functions as a kill switch to stop the operation of first drone 28A to prevent it from depositing further unwanted chemicals to second farm 190. The TERMINATE DISPERSAL MESSAGE includes timing data, farm data, chemical information, drone information, and chemical trespass information. System 32/34 then generates a REVISED DISPERSAL PROGRAM for the first and second drones 28A and 28B to correct for the inaccurate deposition of chemicals onto the first and second farms 188 and 190. The REVISED DISPERSAL PROGRAM will generate a program to first drone 28A to add more chemicals to those regions of first farm 188 that received little or no chemicals, which ended up getting deposited originally on second farm 190. The REVISED DISPERSAL PROGRAM will generate a program to second drone 28B to revise the deposition of similar chemicals onto second farm 190 to prevent a double dosage of chemicals onto regions of second farm 190 that already received the desired chemical from first drone 28A. The REVISED DISPERSAL PROGRAM may include timing data, farm information, chemical information, drone information, chemical trespass information, weather information, and a dispersion program in a zip package. The system 32/34 may also generate a DILUTION PROGRAM for second drone 28B to dilute the unwanted presence of chemicals. The DILUTION PROGRAM may include timing data, farm information, chemical information, drone information, chemical trespass information, weather information, and a dilution program.

FIG. 22 illustrates an information structure and accompanying data for a DISPERSAL MESSAGE 194. DISPERSAL MESSAGE 194 alerts the cloud-based system 32/34 to the fact that first drone 28A is going to disperse chemicals onto the first farm. The DISPERSAL MESSAGE includes timing information, location data, farm information, chemical information, and weather information.

FIG. 23 illustrates an information structure and accompanying data for a CHEMICAL TRESPASS ALERT 196. The chemical sensor 20 located on second farm 190 alerts the system 32/34 that unwanted chemicals are being found on the second farm through a CHEMICAL TRESPASS ALERT message 196 transmitted by server/workstation 36 located on second farm 190. The CHEMICAL TRESPASS ALERT message 196 includes timing information, location information, farm information, chemical information, and weather information. In response to receiving CHEMICAL TRESPASS ALERT message 196, cloud-based system 32/34 correlates available data, such as that received from DISPERSAL MESSAGE 194 to determine which drone from which farm is depositing unwanted chemicals onto second farm 190. Once system 32/34 determines that it is the first drone 28A from farm 188 that is depositing the unwanted chemicals onto the second farm 190, system 32/34 generates a TERMINATE DISPERSAL MESSAGE 198 that is transmitted to first drone 28A through server/workstation 36 on the first farm 188.

FIG. 24 illustrates an information structure and accompanying data for a TERMINATE DISPERSAL MESSAGE. 198. The TERMINATE DISPERSAL MESSAGE 198 functions as a kill switch to stop the operation of first drone 28A to prevent it from depositing further unwanted chemicals to second farm 190. The TERMINATE DISPERSAL MESSAGE 198 includes timing data, farm data, chemical information, drone information, and chemical trespass information.

FIG. 25 illustrates an information structure and accompanying data for a DISPERSAL PROGRAM/REVISED DISPERSAL PROGRAM 200. The drones are programmed with a DISPERSAL PROGRAM 200 when they initially deposit chemicals onto a farm. This DISPERSAL PROGRAM includes timing data, farm information, chemical information, drone information, chemical trespass information, weather information. For the DISPERSAL PROGRAM, it will also include an executable program and associated data. For the DISPERSAL PROGRAM, it will have a program contained in a zip package labeled PATH_PROGRAM.zip along with path route data and chemical quantity data. System 32/34 may generate a REVISED DISPERSAL PROGRAM to be distributed to drones to correct the under-dispersal of chemicals onto a farm or adjust for the over-dispersal of chemicals on a farm. The REVISED DISPERSAL PROGRAM will also include timing data, farm information, chemical information, drone information, chemical trespass information, weather information. For the REVISED DISPERSAL PROGRAM, it will have a program contained in a zip package labeled REVISED_PATH_PROGRAM.zip along with path route data and chemical quantity data.

FIG. 26 illustrates an information structure and accompanying data for a DILUTION PROGRAM 202. The system 32/34 may generate a DILUTION PROGRAM for second drone 28B to dilute the unwanted presence of chemicals. The DILUTION PROGRAM may include timing data, farm information, chemical information, drone information, chemical trespass information, weather information, and revised dispersion program in a zip package along with path route data and dispersal material quantity data.

FIG. 27 illustrates software module diagram of the cloud-based social farming network 32/34 and associated chemical control system 302 regulating the chemical control feedback loop between the drones 24, 26, and 28 and chemical sensor arrays 20. System 32 is a remote data processing and communication center that is in communication with cloud 34 and database store 312. System 32 includes software. This software concludes a control feedback system module that regulates all of the functionality described in the flowcharts depicted in this application. The Graphical User Interface (GUI) 304 supports the GUIs shown in FIGS. 9-14. Drone Program Module for Chemical Dispersion 306 generates the DISPERSAL PROGRAMS and REVISED DISPERSAL PROGRAMS depict in FIG. 25 includes PATH_PROGRAM.zip and REVISED_PATH_PROGRAM.zip that control the operation of drones 24, 26, and 28 to disperse chemicals onto farms as programmed through GUI 304. These DISPERSAL PROGRAMS AND REVISED DISPERSAL PROGRAM are distributed to drones 24, 26, and 28 through cloud 34 via message 200. The drone dispersal data module 304 collects all DISPERSAL MESSAGES 194 sent from all drones 24, 26, and 28 from all farms associated with this system and stores it in the database store 312. DISPERSAL MESSAGES 194 are received through communications system 314. The chemical sensor array database module 310 gathers all of the chemical sensor information gathered from all of the chemical sensor arrays 20 from farms associated with this system and stores it in the database store 312. Upon receipt of a CHEMICAL TRESPASS ALERT MESSAGE, the correlation module 308 correlates the data from the drone dispersal database module and the chemical sensor array database module to determine what drones from what farms are depositing unwanted chemicals onto other farms. This correlation may occur through matching the time, date, proximity of location and type of chemical between what is being dispersed and what is being detected on a different farm. The control feedback system module 302 generates a TERMINATE DISPERSAL MESSAGE sent to the drones that are depositing unwanted chemicals inaccurately on the wrong farms and transmits that message through cloud 34 using the communication system 314. Communication system 314 is in bi-directional communication with all farms, server/workstations 36, all drones 24, 26, and 28, all chemical sensor arrays 20, and all mobile devices 38. Communications system 314 transmits all of the generated DISPERSAL PROGRAMS, REVISED DISPERSAL PROGRAMS, and DILUTION PROGRAMS to drones 24, 26, and 28 through cloud 34.

While the invention has been shown and described with reference to a particular embodiment thereof, it will be understood to those skilled in the art, that various changes in form and details may be made therein without departing from the spirit and scope of the invention.

The invention claimed is:

1. A cloud-based chemical-control system for improving chemical deposition accuracy across multiple farms within a geographic region to enhance environmental quality, comprising:
   a drone that is programmed to deposit a designated quantity of chemicals onto a particular farm amongst a plurality of farms within a geographic area, wherein the drone communicates information about a type and quantity of chemicals being deposited on the particular farm to a cloud-based chemical management control system; and
   a separate chemical sensor array located within each individual farm of the plurality of farms configured to detect the chemicals deposited by the drone, wherein each chemical sensor array communicates information on type and quantity of chemicals deposited on their respective farms to the cloud-based chemical management control system, wherein the cloud-based chemical management control system utilizes the information from a plurality of the separate chemical sensor arrays across the geographic region as a feedback control loop to correlate with the information from the drone to ascertain a quantity of chemicals deposited on the particular farm to determine whether the drone correctly deposited the correct quantity of chemicals on the particular farm it was programmed to or determine a delta difference between the quantity of chemicals it was programmed to deposit and a quantity that actually got deposited.

2. The system of claim 1, wherein the cloud-based chemical management control system is able to correlate that chemicals programmed to be deposited on the particular farm are being incorrectly deposited on a different farm by receipt of information from the drone that it is depositing chemicals meant for the particular farm and receipt of information from the separate chemical sensor array located at the different farm that it is detecting the chemicals programmed for deposition on the particular farm.

3. The system of claim 1, wherein the cloud-based chemical management control system takes corrective action in response to a determination that the drone incorrectly deposited a chemical on a farm it was not programmed to based on control loop feedback information from the chemical sensor arrays by sending instructions to the drone to cease operations or revise its operation path to prevent further deposition of the chemical.

4. The system of claim 1, wherein the cloud-based chemical management control system takes corrective action in response to a determination that the delta difference shows that a higher quantity of chemicals were deposited on the particular farm than what was programmed in the drone by developing a dilution program for a drone to counteract the extra quantity of chemicals deposited over the programmed quantity.

5. The system of claim 1, wherein the cloud-based chemical management control system takes corrective action in response to a determination that the delta difference shows that a lower quantity of chemicals were deposited on the particular farm than what was programmed in the drone by developing a second chemical deposition program for a drone to deposit and additional quantity of chemicals onto the particular farm.

6. The system of claim 5, wherein the additional quantity of chemicals is equivalent to the delta difference correlated by the cloud-based chemical management control system.

7. The system of claim 1, wherein the drone sends a dispersal message to the cloud-based chemical management control system to notify it to the fact that it is dispersing chemicals on the farm it is programmed to, wherein the dispersal message contains information related to the dispersal of the chemicals including timing information, location information, farm information, type of chemical, dispensing rate and concentration, and drone information for use by the cloud-based chemical management system in a control loop feedback to determine the drone's chemical deposition quantity accuracy.

8. The system of claim 1, wherein the cloud-based chemical management control system is able to correlate that chemicals programmed to be deposited on the particular farm are being incorrectly deposited on a different farm by receipt of information from the drone that it is depositing chemicals meant for the particular farm and receipt of information from the separate chemical sensor array for the particular farm that it is not detecting at least some of the chemicals meant for deposition on the particular farm from the drone.

9. The system of claim 1, wherein the cloud-based chemical management control system informs farms that trespassing chemicals have been incorrectly deposited on it via a graphical user interface displayed on a mobile device, or workstation associated with one of the individual farms in response to a correlation that the drone incorrectly deposited chemicals on them by the cloud-based chemical management control system.

10. The system of claim 1, whereby linking the plurality of farms together by their respective separate chemical sensor arrays with the cloud-based chemical management control system enables the cloud-based chemical management control system to regulate a quantity of chemical distribution across linked individual farms in the geographic area to reduce over-deposition of chemicals in the geographic area, thereby enhancing environmental quality.

11. The system of claim 1, whereby the cloud-based chemical management control system is programmed by a separate graphical user interface associated with each individual farm, wherein the cloud-based chemical management control system is programmed to dispense selected types of chemicals at selected quantities via selected types of drones onto specified farms within the geographic region.

12. A cloud-based chemical-control system for distribution of chemicals across multiple farms in a geographic region to enhance environmental quality, comprising:
   a cloud-based chemical management control system that communicates with multiple independent grids of chemical sensors located on separate individual farms within a geographic area, wherein the multiple independent grids of chemical sensors separately communicate information about a type and concentration of chemicals deposited on their respective farms to the cloud-based chemical management control system; and
   a drone configured to deposit chemicals on one of the separate individual farms, wherein the drone communicates information about a type and concentration of chemicals being deposited on the one separate individual farm to the cloud-based chemical management control system, wherein the cloud-based chemical management control system utilizes the information from the multiple independent grids of chemical sensors as a feedback control loop to correlate with the received information about the type and concentration of chemical deposition from the drone to determine if the drone deposited a correct concentration of chemicals onto the one separate farm it was configured to, or whether there is a delta difference between the concentration of chemicals the drone was configured to deposited and a concentration of chemicals that actually got deposited.

13. The system of claim 12, wherein the cloud-based chemical management control system correlates that chemicals configured for deposition for the one separate farm are being incorrectly deposited on a different farm by receipt of information from the drone that it is depositing chemicals on the one separate farm and receipt of information from the independent grid of chemical sensors for the different farm that it is detecting the chemicals which are configured for deposition by the drone onto the one farm.

14. The system of claim 12, wherein the cloud-based chemical management control system takes corrective action in response to a determination that chemicals configured for deposition on the one separate farm are being incorrectly deposited on other farms based on control loop feedback information from the grids of chemical sensors by sending instructions to the drone to cease operations or revise its operation path to prevent further deposition of the chemicals.

15. The system of claim 12, wherein the cloud-based chemical management control system takes corrective action in response to a determination that a delta difference exists showing that too high a concentration of chemicals was deposited by developing a dilution program for the drone to neutralize an extra amount of chemicals that got deposited than the drone was originally configured to deposit.

16. The system of claim 12, wherein the cloud-based chemical management control system takes corrective action in response to a determination that a delta difference exists showing that too low a concentration of chemicals was deposited by developing a secondary chemical distribution program for the drone to deposit an extra amount of chemicals to bring up deposition of chemicals up to the concentration the drone was configured to deposit.

17. A cloud-based chemical-control system for managing distribution of chemicals across multiple farms in a geographic region to enhance environmental quality, comprising:

a cloud-based chemical management control system that regulates chemical deposition location across a plurality of farms within a geographic region through a feedback control loop, wherein the feedback control loop is formed by a drone that dispenses chemicals and farm based chemical sensor arrays that detect the chemicals dispensed by the drone, wherein each of the plurality of farms has a separate chemical sensor array, wherein both the drone and the farm based chemical sensor arrays report types and amount of chemicals to the cloud-based chemical management control system, wherein the cloud-based chemical management control system correlates the information on types and amount of chemicals received from the drone and the farm based chemical sensor arrays in a control feedback loop to determine whether chemicals dispensed by the drone were deposited in a correct amount on a farm that the drone was configured to deposit them on, or whether a delta difference exists between an amount of chemicals that the drone actually deposited on the farm and the amount that the drone was configured to deposit on the farm.

18. The system of claim 17, wherein the cloud-based chemical management control system takes corrective action in response to a determination that a delta difference exists showing that too high an amount of chemicals was deposited by developing a dilution program for the drone to neutralize an extra amount of chemicals that got deposited than the drone was originally configured to deposit.

19. The system of claim 17, wherein the cloud-based chemical management control system takes corrective action in response to a determination that a delta difference exists showing that too low an amount of chemicals was deposited by developing a secondary chemical distribution program for the drone to deposit an extra amount of chemicals to bring up deposition of chemicals up to the amount the drone was configured to deposit.

20. The system of claim 19, wherein the extra amount is equivalent to the delta difference.

* * * * *